(12) United States Patent
Furgiuele et al.

(10) Patent No.: US 6,797,216 B2
(45) Date of Patent: Sep. 28, 2004

(54) PROCESSES OF MIXING, COMPATIBILIZING, AND/OR RECYCLING BLENDS OF POLYMER MATERIALS THROUGH SOLID STATE SHEAR PULVERIZATION, AND PRODUCTS BY SUCH PROCESSES

(75) Inventors: Naomi Furgiuele, Evanston, IL (US); John M. Torkelson, Skokie, IL (US); Klementina Khait, Skokie, IL (US)

(73) Assignee: Northwestern University, Evanston, IL (US)

( * ) Notice: Subject to any disclaimer, the term of this patent is extended or adjusted under 35 U.S.C. 154(b) by 17 days.

(21) Appl. No.: 10/291,761

(22) Filed: Nov. 12, 2002

(65) Prior Publication Data

US 2003/0230824 A1 Dec. 18, 2003

Related U.S. Application Data

(62) Division of application No. 09/193,690, filed on Nov. 18, 1998, now Pat. No. 6,479,003.

(51) Int. Cl.[7] .............................................. B29C 47/00
(52) U.S. Cl. .............................. 264/176.1; 264/211.21; 264/920
(58) Field of Search .............................. 264/523, 176.1, 264/211.21, 109, 123, 125, 126, 140, 331.15, 920

(56) References Cited

U.S. PATENT DOCUMENTS

| | | | | |
|---|---|---|---|---|
| 3,014,426 A | * | 12/1961 | Wellman | 244/3.16 |
| 3,102,716 A | * | 9/1963 | Frenkel | 366/88 |
| 3,161,437 A | * | 12/1964 | Tourneau | 298/19 R |
| 3,342,901 A | * | 9/1967 | Kosinsky et al. | 525/197 |
| 3,525,124 A | * | 8/1970 | Ocker | 425/204 |
| 3,728,053 A | * | 4/1973 | Stillhard et al. | 425/4 R |

(List continued on next page.)

FOREIGN PATENT DOCUMENTS

| | | | |
|---|---|---|---|
| DE | 4130315 | * | 1/1993 |
| EP | 0596835 | * | 5/1994 |
| EP | 0841149 | * | 5/1998 |
| GB | 1548978 | * | 7/1979 |
| WO | WO9515819 | * | 6/1995 |

OTHER PUBLICATIONS

Vicosity Ratio Effects in the Compounding of Low Viscosity, Immiscible Fluids into Polymeric Matricies, C. E. Scott and S. K. Joung, Polymer Eng. and Sci., vol. 36, No. 12, pp. 1666–1674, Jun. 1996.*

(List continued on next page.)

Primary Examiner—Mark Eashoo
(74) Attorney, Agent, or Firm—Liniak, Berenato & White, LLC

(57) ABSTRACT

A method of making polymeric particulates wherein polymeric scrap material, virgin polymeric material and mixtures thereof are supplied to intermeshing extruder screws which are rotated to transport the polymeric material along their length and subject the polymeric material to solid state shear pulverization and in-situ polymer compatibilization, if two or more incompatible polymers are present. Uniform pulverized particulates are produced without addition of a compatibilizing agent. The pulverized particulates are directly melt processable (as powder feedstock) and surprisingly yield a substantially homogeneous light color product. The pulverized particulates also can be more intimately mixed than mixtures which are provided by only melt mixing, and can be melt processed without a significant delay in achieving phase inversion. The pulverized particulates also provide a stable microstructure.

26 Claims, 23 Drawing Sheets

U.S. PATENT DOCUMENTS

| | | | | |
|---|---|---|---|---|
| 3,814,566 A | * | 6/1974 | Stroup | 425/144 |
| 3,874,835 A | * | 4/1975 | Rossiter et al. | 425/306 |
| 3,889,889 A | * | 6/1975 | Sawa | 241/228 |
| 3,976,730 A | * | 8/1976 | Cushing | 264/140 |
| 4,017,555 A | * | 4/1977 | Alvarez | 525/436 |
| 4,067,826 A | * | 1/1978 | Emery | 521/46.5 |
| 4,090,670 A | * | 5/1978 | Bennett | 241/23 |
| 4,098,463 A | * | 7/1978 | Lowry | 241/17 |
| 4,181,647 A | * | 1/1980 | Beach | 264/45.9 |
| 4,184,772 A | * | 1/1980 | Meyer | 366/77 |
| 4,250,222 A | * | 2/1981 | Mavel et al. | 442/168 |
| 4,367,190 A | * | 1/1983 | Beach | 264/171.19 |
| 4,511,091 A | * | 4/1985 | Vasco | 241/18 |
| 4,607,796 A | * | 8/1986 | Enikolopov et al. | 241/3 |
| 4,607,797 A | * | 8/1986 | Enikolopow et al. | 241/23 |
| 4,650,126 A | * | 3/1987 | Feder et al. | 241/22 |
| 4,708,617 A | * | 11/1987 | Herrington | 425/135 |
| 4,716,000 A | * | 12/1987 | Kerschbaum et al. | 264/83 |
| 4,772,430 A | * | 9/1988 | Sauda et al. | 588/8 |
| 4,875,847 A | * | 10/1989 | Wenger et al. | 425/204 |
| 4,890,996 A | * | 1/1990 | Shimizu | 425/145 |
| 4,917,834 A | * | 4/1990 | Hadermann et al. | 264/8 |
| 4,968,463 A | * | 11/1990 | Levasseur | 264/40.1 |
| 4,997,131 A | * | 3/1991 | Heren | 239/397.5 |
| 5,026,512 A | * | 6/1991 | Chang | 264/40.6 |
| 5,073,320 A | * | 12/1991 | Sterzel | 264/101 |
| 5,088,914 A | * | 2/1992 | Brambilla | 425/208 |
| 5,395,055 A | * | 3/1995 | Shutov et al. | 241/16 |
| 5,395,065 A | * | 3/1995 | Hirose | 242/223 |
| 5,397,065 A | * | 3/1995 | Shutov et al. | 241/16 |
| 5,415,354 A | * | 5/1995 | Shutov et al. | 241/16 |
| 5,670,139 A | * | 9/1997 | Allard et al. | 424/59 |
| 5,814,673 A | * | 9/1998 | Khait | 521/40 |
| 6,180,685 B1 | * | 1/2001 | Khait | 521/40 |
| 6,479,003 B1 | * | 11/2002 | Furgiuele et al. | 264/176.1 |

\* cited by examiner

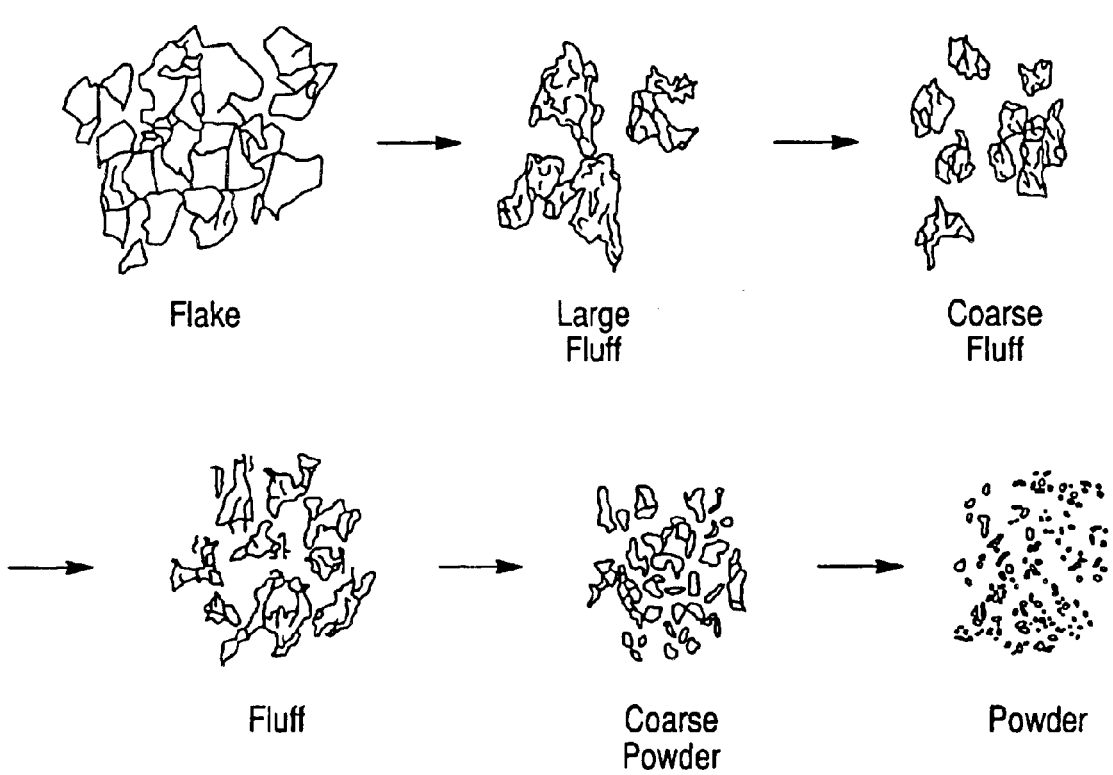

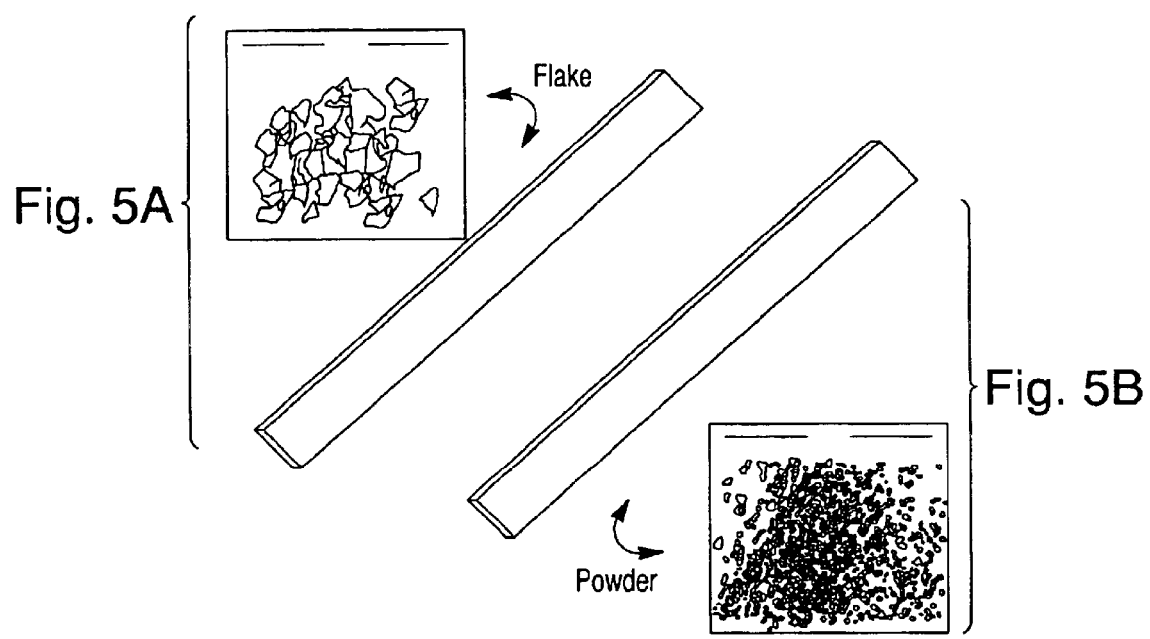

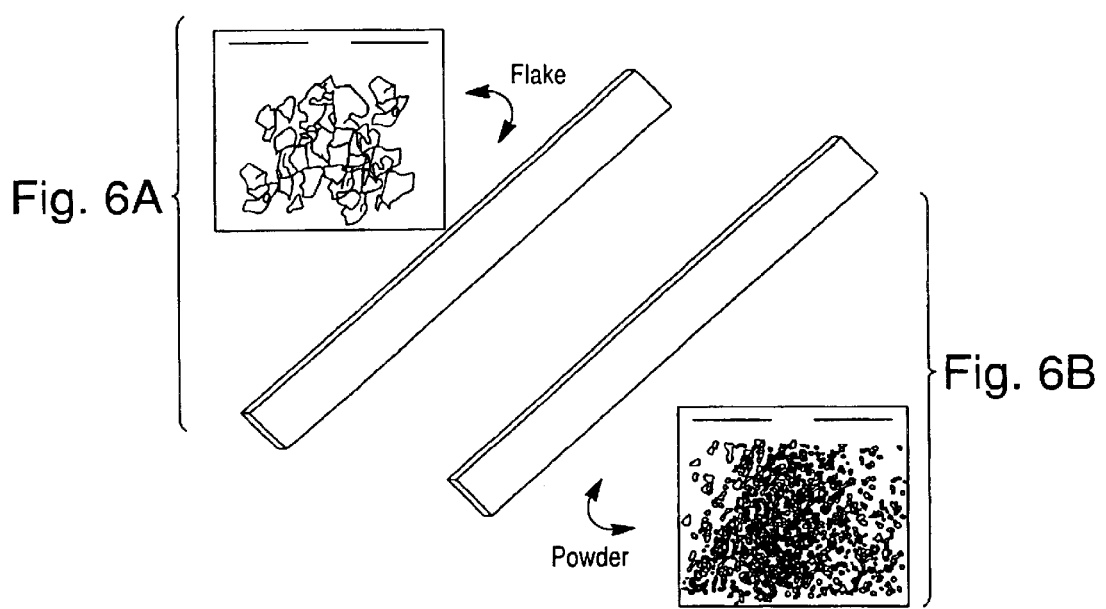

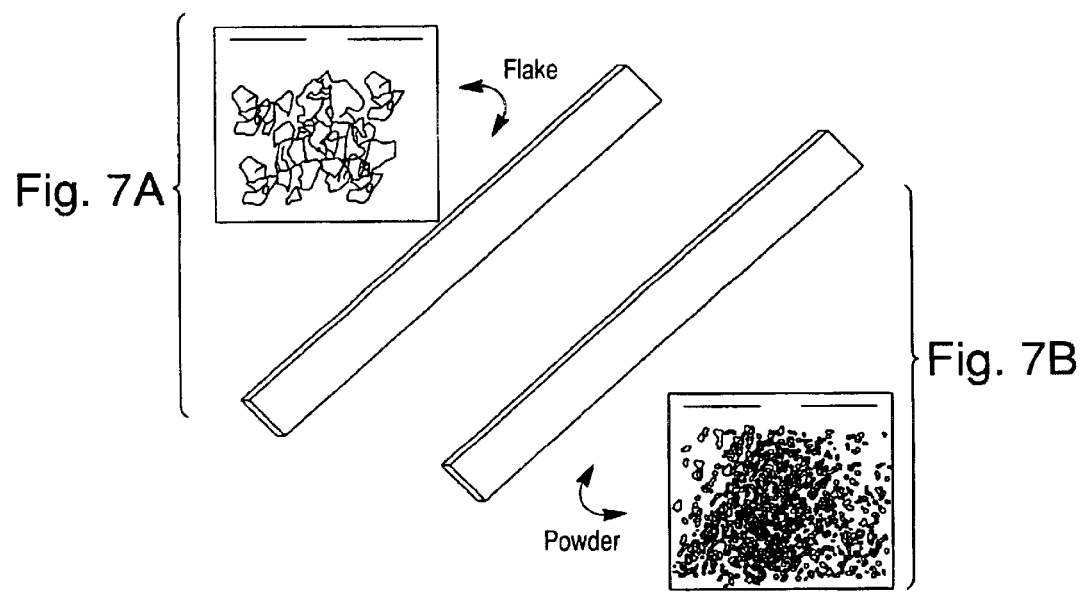

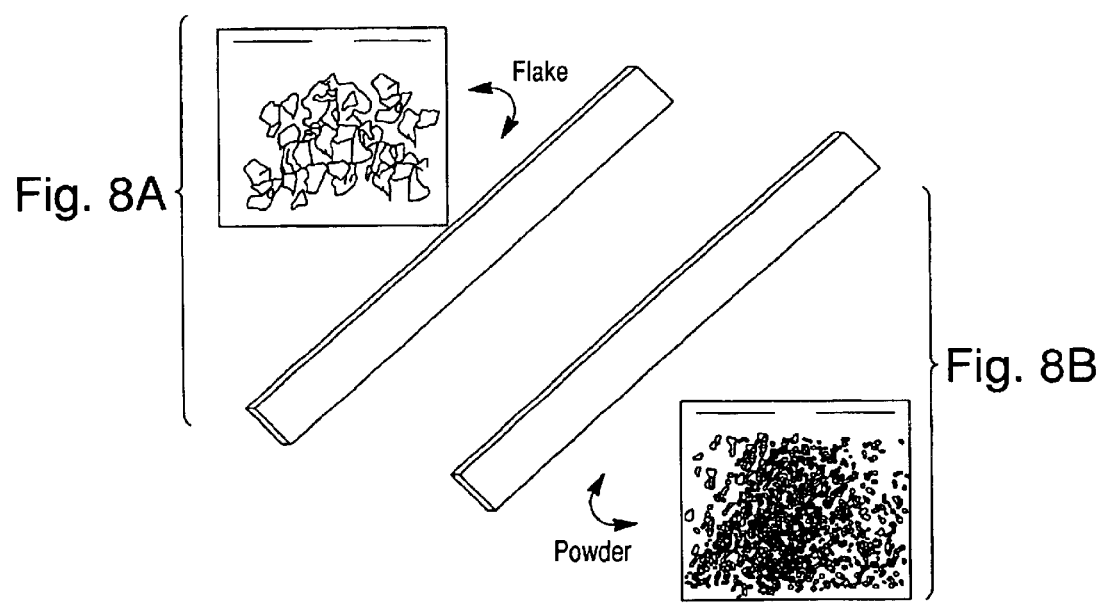

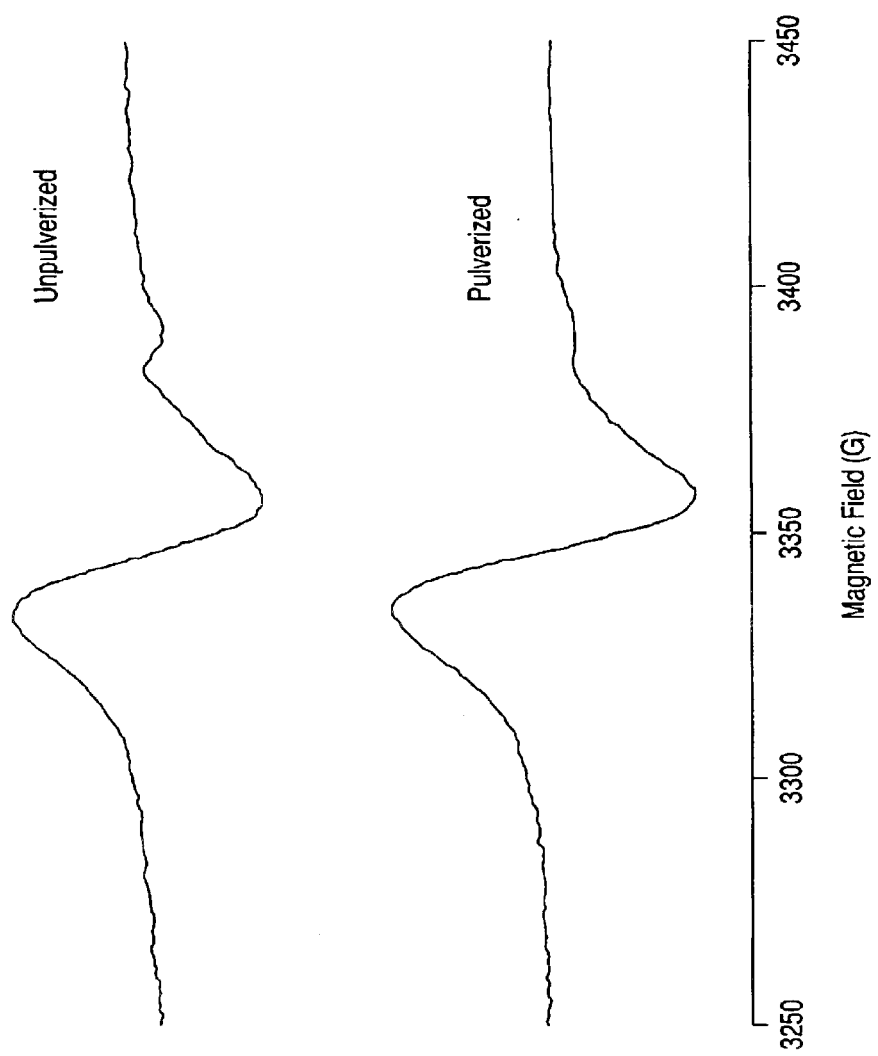

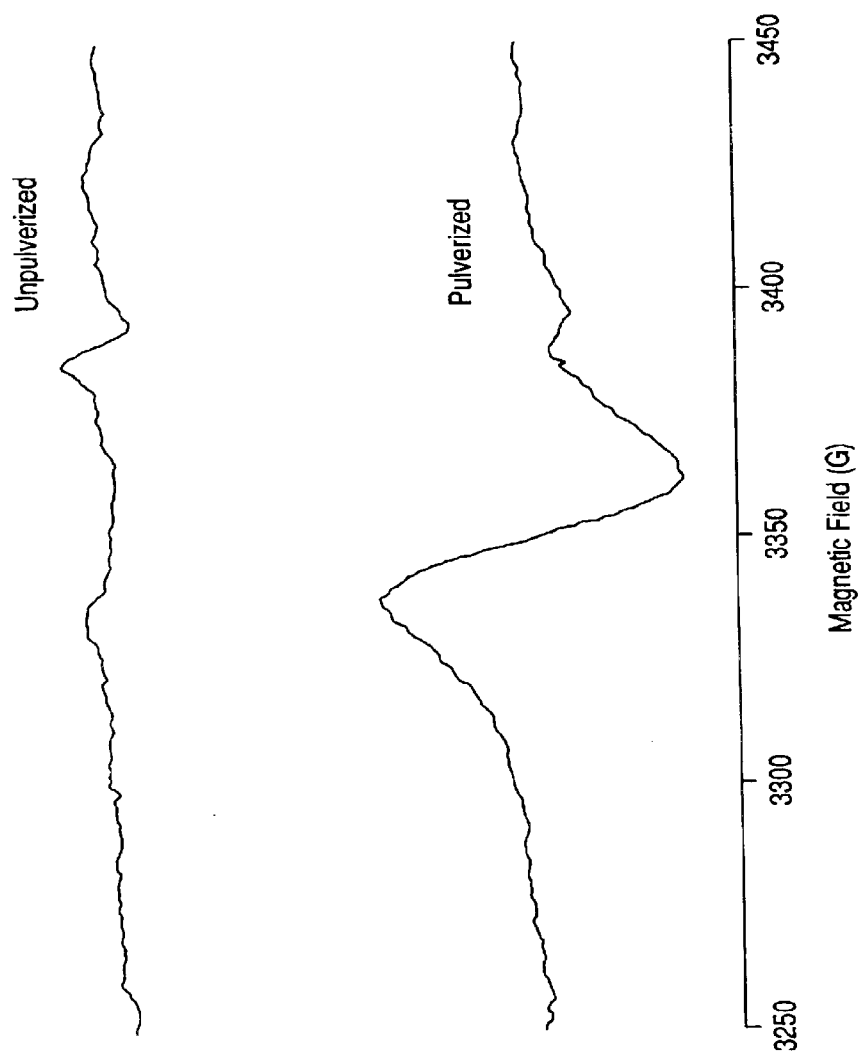

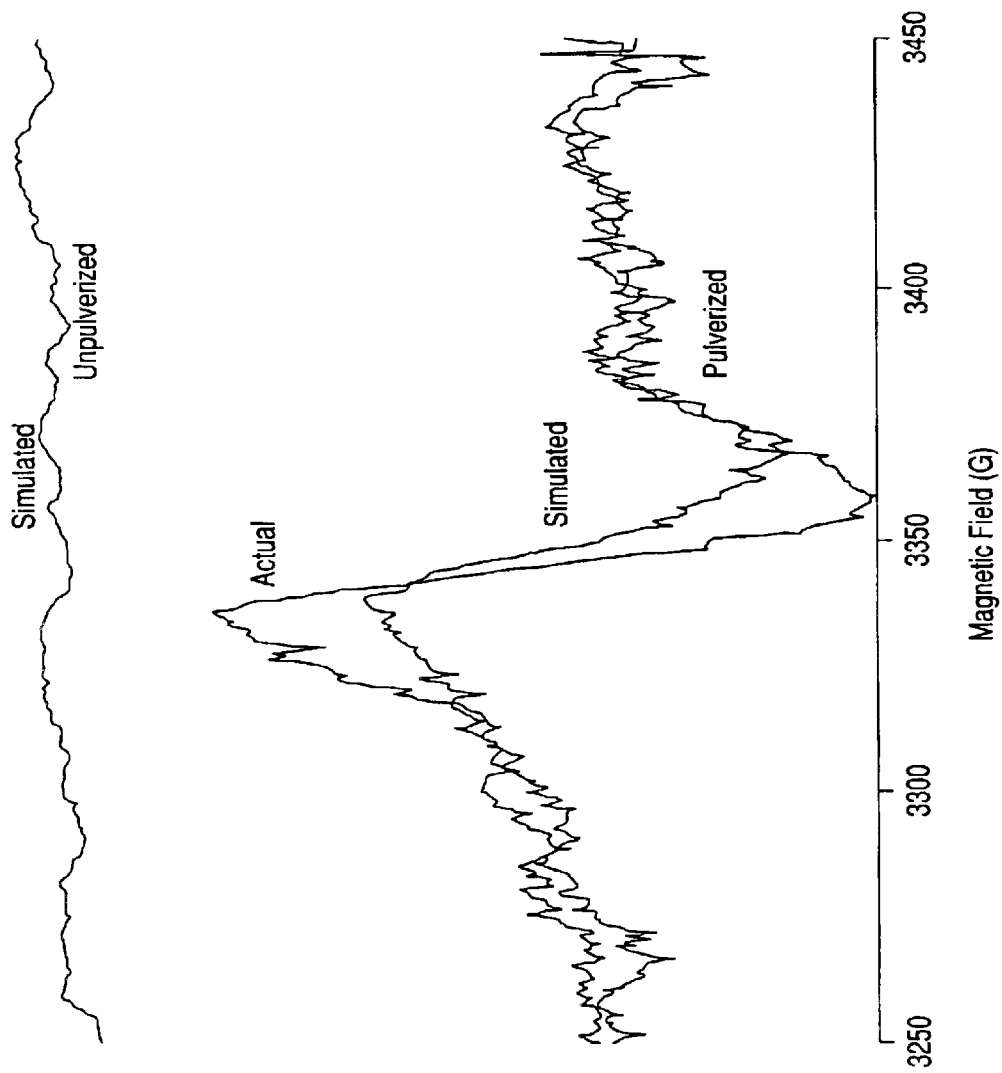

PROCESSES OF MIXING, COMPATIBILIZING, AND/OR RECYCLING BLENDS OF POLYMER MATERIALS THROUGH SOLID STATE SHEAR PULVERIZATION, AND PRODUCTS BY SUCH PROCESSES

This application is a division of Ser. No. 09/193,690, filed Nov. 18, 1998, now U.S. Pat. No. 6,479,003.

BACKGROUND OF THE INVENTION

The present invention relates to solid state shear pulverization of polymeric material, which may include thermodynamically incompatible polymers, to form without compatibilizing agents pulverized particulates that are directly melt processable as powder feedstock to shaped articles of manufacture by conventional blow molding, rotational molding, extrusion, and spray coating techniques without color streaking in the resulting articles of manufacture.

Decreasing landfill space and rapidly rising disposal costs have forced many municipalities to begin curbside recycling of post-consumer plastic (polymeric) waste. In general, plastic materials comprise approximately 20% by volume of the municipal waste stream. For example, Chem Systems, 1992, reports that municipal solid waste comprises, by weight, 48% polyethylene (PE) (27% being low density PE and 21% being high density PE), 16% polypropylene (PP), 16% polystyrene (PS), 6.5% polyvinyl chloride (PVC), 5% polyethylene terephthalate (PET), 5% polyurethane, and 3.5% other plastics.

Post-consumer polymeric waste, as opposed to industrial plastic waste, typically includes substantial quantities of plastic bottles, containers and packaging materials. Plastic bottles are molded of different polymeric materials depending upon the product they are to contain. For example, plastic bottles for water, milk, and household chemicals typically are made of high density polyethylene (HDPE), while soft drink bottles are typically made of polyethylene terephthalate (PET) with or without base caps made from high density polyethylene (HDPE). Generally, HDPE bottles account for approximately 50–60% and PET bottles account for approximately 20–30% of the bottles used by consumers. The balance of bottles, bottle caps and other containers used by consumers comprises other polymeric materials, such as low density polyethylene (LDPE), polypropylene (PP), polystyrene (PS), polyvinyl chloride (PVC), and other resins and multi-layered materials.

Plastic packaging materials also are made of a wide variety of polymers. For example, according to Plastics Compounding, Nov/Dec, 1992, the following polymers were used in packaging material in the %'s set forth: 27% LDPE, 21% HDPE, 16% PS, 16% PP, and 5% PET.

Post-industrial plastic waste can comprise polyolefins, PS, PET and other polymeric materials used for plastic packaging. Currently, collection of plastic waste material exceeds the market demand for recycled plastic products as a result of the dearth of viable recycling technologies that are low cost and produce high quality recycled plastic products. One recycling approach has involved the high energy consuming batch grinding of commingled, unsorted mixed color plastic waste to form flake scrap material, melt processing and pelletizing the melt processed material to pellets, and extruding the pelletized plastic waste to form recycled plastic products. However, recycled plastic products made in this manner suffer from severe deficiencies that render the products unsatisfactory for many purposes and are of inferior, low value compared to products made of virgin polymeric materials. For example, these recycled plastic products exhibit inferior mechanical properties (e.g. tensile, flexural and impact strength) and inferior appearance in terms of color (dark brown or gray color) with streaking of colors within the molded product as a result of the chemical incompatibility of the different polymers present in the initial plastic waste stream and variations in the plastic waste stream composition over time.

A typical example of a low value, recycled plastic product is recycled plastic lumber having a dark brown or gray color with noticeable color streaking and inferior mechanical properties compared to components molded of virgin materials. As a result of the less than pleasing appearance, recycled plastic lumber is oftentimes painted to improve its appeal to the customer, or expensive pigments and other additives are added to the feedstock during the manufacturing process to this end. However, the cost of the recycled product is increased thereby.

Furthermore, certain melt processing techniques, such as blow molding, rotational molding, extrusion (e.g. extruded PVC pipe and profiles), and spray coating, require a plastic powder feedstock. That is, the flake scrap material is not directly melt processable to articles of manufacture by such powder feedstock-requiring melt processing techniques. To be useful as feedstock in such melt processing techniques, sorted or unsorted flake scrap material produced by batch grinding must be pelletized and then ground to powder form. The need to pelletize and grind sorted or unsorted flake scrap polymeric material prior to such melt processing adds considerably to the cost and complexity of recycling scrap plastics as well as the capital equipment expenditures required.

Conventional injection molding techniques require plastic pellets for high speed production of molded parts. Although unsorted, commingled flake scrap materials could be pelletized to provide feedstock for injection molding, the resultant molded products would suffer from the types of deficiencies discussed above attributable to polymer incompatibility.

So-called compatibilizing agents and/or reinforcing agents can be added to flake plastic scrap material comprising chemically incompatible polymers in attempts to produce a recycled plastic product exhibiting more desirable characteristics. However, addition of these agents to the plastic scrap material makes recycling more difficult and adds considerably to its cost. The Mavel et at. U.S. Pat. No. 4,250,222 relates to this type of recycling approach and is representative of the disadvantages associated with such an approach to plastic recycling.

Attempts have been made to sort commingled, post-consumer plastic scrap to overcome the polymer incompatibility problems associated with the recycling of commingled plastic scrap. To-date, HDPE and PET are recovered from plastic waste streams by recycling technologies requiring sorting of the commingled plastic materials. Sorting, however, can require use of costly techniques, such as video cameras, electronic devices, infrared detectors, and organic "markers", to provide effective segregation of like plastics.

The high cost of sorting has greatly limited widespread use of recycling approaches that require a sorting step. In particular, collected and sorted post-consumer plastic materials are usually more expensive than the corresponding virgin plastic materials. Thus, users of plastic materials are discouraged from using sorted, recycled plastic materials.

Further, sorted plastic scrap must be subjected to batch grinding to produce flake scrap material that then must be pelletized and ground again to provide powder feedstock for blow molding, rotational molding, some extruding, spray coating and other melt processing techniques that require powder feedstock.

Even sorted plastic waste, however, can present problems in processing as a result of density and chemical differences among polymers falling in the same general class and made by different plastics manufacturers. The same polymer, for example, may have different viscosities in different products. Such differences in viscosity tend to make melt mixing of the same polymer from different products difficult and time consuming.

A study of the effect of viscosity differences on the ability to melt mix polymers was conducted by Chris E. Scott and Sandra K. Joung at the Massachusetts Institute of Technology, Department of Materials Science and Engineering. The results of this study appear in Scott & Joung, *Viscosity Ratio Effects in the Compounding of Low Viscosity, Immiscible Fluids into Polymeric Matrices*, Polymer Engineering and Science, Vol. 36, No. 12, June 1996 (hereinafter "Scott & Joung"), the contents of which are incorporated herein by reference.

According to Scott & Joung, many low viscosity, immiscible fluids are difficult to incorporate into polymer matrices because of thermodynamic immiscibility and a large mismatch of melt viscosities. A model system was used in their study to determine the mechanisms and kinetics of mixing in such formulations. The model systems consisted of a series of different molecular weight polyethylenes (PE) in polystyrene (PS). The viscosity ratio (major/minor) at 180 degrees Celsius and 100/s was varied from 1.43 to 333. During the study, phase inversion of these formulations in response to compounding was observed. The phase inversion was associated with a transition from low to high mixing torque during compounding. This change was primarily due to an increase in the blend viscosity caused by the morphological transformation. The melting behavior during compounding depended on the melt viscosity of the polyethylene.

According to Scott & Joung, a critical viscosity ratio (major/minor) of 10 exists above which softening of the polystyrene, and thus mixing of the two components, was greatly retarded. Even at very low concentrations, low viscosity polyethylene can have a significant effect on the processing behavior. Effects of mixer set temperature, degree of fill, and polyethylene particle size were explored during the study. The roles of thermal conduction and mechanical energy input were evaluated in the melting regime of the process. FIG. 1A is a graph of mixing torque with respect to time for a PS/PE-D blend with a PE-D concentration of 7.8 wt % and mixer set temperatures of 140, 160, 180, and 200 degrees Celsius. The phase inversion is represented by a sudden rise in mixing torque. After the phase inversion, the mixing torque remains substantially constant. Notably, even at the high temperature of 200 degrees Celsius, it takes about five minutes for the phase inversion to occur. At the lower temperatures, it takes even longer. The study by Scott & Joung therefore demonstrates that melt mixing of polymers with a viscosity ratio (major/minor) greater than 10 is difficult and time consuming. Such polymers thus are conventionally considered to be practically incompatible.

The study by Scott & Joung also demonstrates that there is no delayed phase inversion when the polymer materials have the same viscosity (i.e., a viscosity ratio of 1) or when the viscosities are sufficiently close to one another. However, when the polymer materials have significant differences in their respective viscosities, a phase inversion is observed in response to prolonged melt mixing. The absence of a delayed phase inversion when a mixture of materials is melt processed, therefore, tends to indicate that the two materials, whether the same or different polymers, are intimately mixed with one another.

SUMMARY OF THE INVENTION

It is a primary object of the present invention to overcome one or more of the foregoing problems, and to satisfy the need in the art for a process of compatibilizing and/or intimately mixing polymers such that products of superior quality can be easily and inexpensively made by melt processing the resulting mixture.

It is another object of the invention to provide a method of processing one or more polymeric materials, such as sorted or unsorted, commingled scrap polymeric material, by solid state pulverization to produce pulverized particulates (e.g. powder) that can be directly formed to shape by powder feedstock-using melt processing techniques.

It is still another object of the invention to provide a method of processing polymeric materials, such as sorted or unsorted, commingled scrap polymeric materials, having mixed colors by solid state pulverization to produce pulverized particulates that are melt processable to a substantially homogeneous light color without color streaking or marblizing despite being produced from the mixed color scrap materials.

It is a further object of the invention to provide a method of processing polymeric materials in a manner to achieve in-situ compatibilization of different polymers present.

It is a further object of the present invention to provide a method of recycling commingled scrap polymeric materials without sortation and in a manner to achieve in-situ compatibilization of different polymers present and produce recycled polymeric particulates without the need for a compatibilizing agent.

It is still another object of the present invention to provide a method of recycling commingled, mixed-color scrap polymeric materials without sortation and in a manner to produce recycled polymeric particulates that are melt processable to homogeneous light color without color streaking or marblizing.

It is still another object of the present invention to provide solid state pulverized polymeric particulates that are suitable as powder feedstock for melt processing by blow molding, rotational molding, some extruding, spray coating and other powder feedstock-using melt processing techniques.

It is still a further object of the present invention to provide solid state pulverized polymeric particulates that are melt processable to a homogenous light color, despite being produced from mixed-color polymers.

It is still a further object of the present invention to produce articles of manufacture, including molded parts and coatings, made from the aforementioned solid state pulverized polymeric particulates.

To achieve these and other objects, the present invention provides a process of compatibilizing polymer materials. The process comprises the steps of providing at least first and second polymer materials; effecting a chemical change in the polymer materials by applying mechanical energy thereto through solid state shear pulverization in the presence of cooling, and discharging particles produced by effecting the chemical change. The cooling is sufficient to maintain the polymer materials in a solid state during the pulverization. The pulverization generates a particulate mixture of the polymer materials which exhibits a more stable microstructure when annealed than mixtures produced by melt mixing of the polymer materials. The present invention also provides a product by this process.

According to another aspect of the present invention, a process of intimately mixing polymer materials is provided. The process comprises the steps of providing at least first and second polymer materials, applying mechanical energy to the polymer materials through solid state shear pulverization in the presence of cooling, to effect more intimate mixing of the first and second polymer materials than would be provided by melt mixing of those materials, and discharging particles produced by applying the mechanical energy. The cooling is sufficient to maintain the polymer materials in a solid state during the pulverization. The present invention also provides a product by this process.

According to yet another aspect of the present invention, a process of mixing polymer materials is provided. The process comprises the steps of providing at least first and second polymer materials, performing solid state shear pulverization on the polymer materials such that particles of the polymer materials which are produced by the pulverization exhibit no substantial time delay before phase inversion when subsequently subjected to melt processing, cooling the polymer materials sufficiently during the solid state shear pulverization that the polymer materials remain in a solid state, and discharging the particles produced by the solid state shear pulverization. The present invention also provides a product by this process.

Still another aspect of the present invention is provided by a process of mixing and compatibilizing polymer materials. The process comprises the steps of providing at least first and second polymer materials, performing solid state shear pulverization on the polymer materials while keeping such polymer materials in a solid state, and discharging particles produced by the solid state shear pulverization. The pulverization is performed so as to effect a chemical change in the polymer materials and to effect more intimate mixing of the polymer materials than would be provided by melt mixing of the polymer materials, resulting in a mixture of the polymer materials which exhibits a more stable microstructure than other mixtures generated by melt mixing the polymer materials. The present invention also provides a product of the method.

According to yet another aspect of the present invention, a process of recycling commingled polymeric feedstock is provided. The process comprises the steps of providing commingled polymeric feedstock made from materials having different characteristics, effecting a chemical change in the commingled polymeric feedstock by applying mechanical energy thereto through solid state shear pulverization in the presence of cooling, and making a product from particles generated by effecting the chemical change. The product is microstructurally stable as a result of the chemical change. The cooling is sufficient to maintain the polymer materials in a solid state during the pulverization.

The present invention also provides, in another aspect, a method of making polymeric particulates (e.g. powder) wherein sorted or unsorted, commingled polymeric scrap material, virgin polymeric material and mixtures thereof are supplied to extruder screw means rotated to transport the material along the length thereof and in the solid state convert the material to pulverized particulates (e.g. powder) that are melt processable directly by conventional blow molding, rotational molding, extrusion, spray coating and other melt processing techniques requiring a powder feedstock. This avoids the need for and costs associated with flake pelletizing and pellet grinding operations heretofore required.

The solid state pulverized particulates also are melt processable by conventional molding, extruding, spray coating and the like to form articles of manufacture having a substantially homogenous color appearance without color streaking or marbleizing. This color homogeneity is achievable regardless of whether the particulates include mixed color polymeric material of the same or different composition. This avoids the need for the addition of pigments and/or compatibilizing agents to the feedstock and the need to paint the molded or extruded product to hide unpleasant colors and color streaking.

The present invention provides in another aspect a method of making polymeric particulates wherein polymeric material, such as unsorted polymeric scrap material, comprising two or more thermodynamically incompatible polymers is supplied to extruder screw means rotated to transport the material along the length thereof and subject the material to solid state pulverization and in-situ polymer compatibilization.

In-situ polymer compatibilization is evidenced, in one instance, by the resulting pulverized polymeric particulates exhibiting a thermogram different from that of the precursor unpulverized material. For example, the pulverized particulates of the invention exhibit a melting peak and/or crystallization peak quite different from that (those) of the unpulverized material. Moreover, molded articles produced from the pulverized particulates of the invention exhibit increased tensile strengths and lack of delamination upon breaking in mechanical testing, this being a further indication of in-situ polymer compatibilization.

As further evidence of polymer compatibilization, hen the pulverized particulates are melt processed, the resulting products have a stable microstructure. That is, recrystallization of the product remains inhibited, even after the product is annealed for 2 hours. In addition, the glass transition temperature of the product remains substantially the same before and after annealing for two hours. Such a stable microstructure provides further evidence that the aforementioned process achieves polymer compatibilization.

In practicing the present invention, the polymeric scrap material and/or virgin material can include thermoplastics, polymer blends, polymer alloys, thermosets, elastomers and other polymeric materials. Typically, the polymeric material is comminuted to flake form by grinding, chopping or shredding using conventional equipment prior to pulverization. The pulverization process uses as scrap feedstock a material that is in a physical form (e.g. comminuted flakes) commonly available from scrap collections and municipal recycling centers.

Also, in practicing the present invention, the polymeric material can be heated during the initial stage of the pulverization operation depending upon the make-up (composition) of the feedstock followed by cooling during subsequent stages of the pulverizing operation to maintain proper temperature control for solid state pulverization, in-situ polymer compatibilization and production of desired powder size. Preferably, however, the polymeric material is only subjected to frictional heating during the initial stage of the pulverization operation by engagement with the rotating screws. That is, solid state shear pulverization of the polymeric material preferably is conducted without heating of the material by any external extruder barrel heating device. Temperature control of the polymeric material during the pulverization operation is thereby facilitated to reduce degradation of the polymers and dye materials used with the feedstock polymers. Energy consumption during the pulverization operation also is reduced.

The present invention provides in still another aspect a method of making an article of manufacture having a substantially homogenous color from mixed-color polymeric material, such as sorted or unsorted, commingled polymeric scrap material. In this embodiment of the invention, mixed-color polymeric material of the same or different composition is supplied to extruder screw means rotated to transport the polymeric material along the length thereof to subject the material to solid state pulverization to form pulverized particulates The pulverized particulates are molded, extruded or otherwise melt processed to form a substantially homogeneously colored shape characterized by the absence of color streaking and marblizing, despite the particulates originating from mixed-color polymeric material. Typically, the pulverized powder is processable to a substantially homogenous pastel color tone corresponding to a dominant color of a particular scrap component in the feedstock.

The present invention also provides solid state pulverized particulates produced from scrap polymeric material and/or virgin polymeric material wherein the particulates are suitable as powder feedstock, without conventional melt pelletizing and pellet grinding, for direct melt processing to shape using blow molding, rotational molding, some extrusion, spray coating, and other powder feedstock-using techniques.

The present invention further provides solid state pulverized polymeric particulates comprising two or more otherwise thermodynamically incompatible polymers produced from commingled, unsorted polymeric scrap materials and/or virgin materials. The polymers are in-situ compatibilized by solid state shear pulverization as evidenced by one or more different thermogram characteristics between recycled particulates of the invention and unpulverized polymeric material. Typically, the solid state pulverized particulates exhibit enhanced reactivity as compared to the unpulverized polymeric material.

Moreover, the present invention provides solid state pulverized polymeric particulates that exhibit, pulverized and as-melt processed, a substantially homogenous color despite being pulverized from mixed-color scrap material.

Articles of manufacture and powder coatings produced from the solid state pulverized particulates of the present invention exhibit mechanical properties generally superior to those exhibited by like processed flake polymeric material of the same composition depending on the polymer components involved. Importantly, they also exhibit a substantially homogenous color characterized by the absence of color streaking or marblizing. Typically, the articles of manufacture exhibit a substantially homogeneous pastel color tone corresponding to a dominant color of a scrap component in the polymeric feedstock. Importantly, the recycled, pulverized particulates of the invention made from mixed-color polymeric feedstock can be used in molding a plurality of articles of manufacture that exhibit substantially the same homogeneous pastel color from one article to the next. In contrast, a mixture of unpulverized flake polymeric material of like composition and mixed color produces molded articles exhibiting inconsistent colors from one molded article to the next.

The present invention is advantageous in that the pulverized particulates are suitable for direct use as powder feedstock for powder feedstock-using melt processing techniques without the need for pelletizing and pellet grinding operations. Moreover, commingled scrap polymer materials, virgin polymeric materials and mixtures thereof can be processed in a manner to achieve in-situ compatibilization of different polymers in a once-through pulverization operation without the need for a compatibilizing agent and without sortation in the case of commingled scrap feedstock. The pulverized particulates may be mixed with fillers, reinforcing agents, flame retardants, antioxidants and other additives commonly used in the plastics industry if desired.

Moreover, the present invention is advantageous in that sorted or unsorted, commingled mixed-color polymeric materials and/or virgin polymeric materials can be pulverized as polymeric particulates that are melt processable to substantially homogeneous light color without the color streaking or marblizing heretofore experienced using other recycling procedures.

The present invention can provide a high value, low cost recycled particulates product, as well as products molded or otherwise melt processed therefrom, thereby increasing utilization of available plastic scrap.

BRIEF DESCRIPTION OF THE DRAWINGS

The aforementioned objects and advantages will become more readily apparent from the following detailed description and drawings.

FIG. 2 represents the morphological transformation of flake-shaped scrap feedstock to powder due to solid state shear pulverization in the extruder in accordance with the invention.

FIGS. 5A, 6A, 7A and 8A are color photographs of post-consumer, flake scrap feedstock and specimens injection molded therefrom and FIGS. 5B, 6B, 7B and 8B are color photographs of pulverized powder of the invention and specimens injection molded therefrom.

FIGS. 9, 10, and 11 are electron spin resonance (ESR) spectra of various as-received post-consumer, flake scrap samples and pulverized powder samples of the invention of various compositions.

DESCRIPTION OF PREFERRED EMBODIMENTS

Figure 1A:
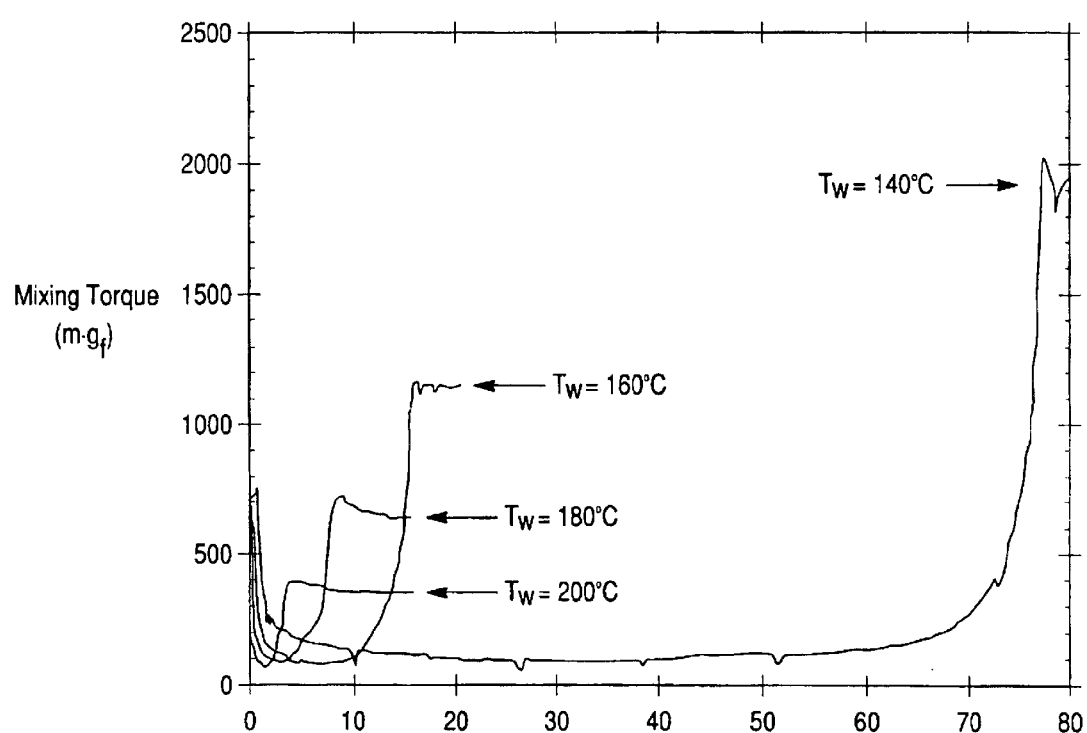
FIG. 1A is a graph of mixing torque with respect to time which shows phase inversions at different temperatures when polymers having a viscosity ratio of 200 are melt mixed.

Preferred implementations of the present invention will be described with reference to the appended drawings. Many of the following implementations of the present invention have been described in U.S. Pat. No. 5,814,673, the contents of which are incorporated herein by reference.

In one embodiment, the present invention provides a method of making recycled polymeric particulates, such as powder, from post-consumer and/or post-industrial polymeric scrap material that may be sorted or unsorted, commingled so as to include two or more different scrap polymers.

Post-consumer polymeric waste typically includes substantial quantities of plastic bottles, containers and packaging materials made of different polymers. For example, plastic bottles for water, milk, and household chemicals typically are made of high density polyethylene (HDPE), while soft drink bottles are typically made of polyethylene terephthalate (PET) with or without base cups made of HDPE. Generally, HDPE bottles account for approximately 50–60% and PET bottles account for approximately 20–30% of the bottles used by consumers. The balance of bottles and other containers used by consumers comprise other polymeric materials, such as low density polyethylene (LDPE), polypropylene (PP), polystyrene (PS), polyvinyl chloride (PVC), and other resins and multi-layered materials.

Post-consumer polymeric waste also includes plastic packaging materials that are made of a wide variety of polymers including LDPE, HDPE, PS, PP, PET and others.

Post-industrial plastic waste can comprise polyolefins, PS, PET, and other polymeric materials used for plastic packaging.

Sorted polymeric scrap material typically comprises a single polymer composition collected from one or more sources and sorted pursuant to standard polymer codes now used on plastic bottles, containers and the like. Sorted polymeric scrap material typically includes scrap of different colors since to-date color sorting is not yet common.

Unsorted, commingled scrap material can include various types of polymeric scrap materials including, but not limited to, HDPE, LDPE, PP, PS, PET, PVC, PC (polycarbonate), ABS/PC (acrylonitrile butadiene styrene/polycarbonate), PPo (polyphenylyene oxide)/PS and others. In general, commingled, unsorted scrap can include thermoplastics, polymer blends, polymer alloys, thermosets, elastomers and other scrap polymeric materials.

Typically, unsorted, commingled scrap material will include mixtures of polymers which are incompatible, such as mixtures of HDPE and PET, mixtures of HDPE and PS, mixtures of PP and PS, mixtures of HDPE, LDPE with PET and/or PS for purposes of illustration. By mutually thermodynamically incompatible it is meant that two or more polymers, when mixed to form a blend and then annealed, separate further into distinct microscopic phases (i.e., the blend is not microstructurally stable), which is reflected in mechanical property deficiencies of the blend.

The presence of these incompatible polymers has rendered previous attempts at reclamation of unsorted, commingled scrap highly costly due to the need for sortation and/or addition of one or more of compatibilizing agents, reinforcing agents, fillers, and pigments and also ineffective in yielding a high value recycled product having aesthetic characteristics and mechanical properties approaching those achievable with virgin plastic material.

The commingled, unsorted plastic scrap typically will include polymeric scrap materials having various colors as a result of the wide variety of colorants used in the plastic bottling, container and other plastic industries.

Thermodynamic polymer incompatibility readily manifests itself in resulting molded polymeric products that are characterized by one or more of delamination, brittleness, and inconsistent mechanical properties from one molded part to the next. Moreover, parts molded from mutually incompatible, mixed-color polymers are typically characterized by inconsistent color from one molded part to the next and also by color streaking or marblizing through the same molded part. These characteristics are observed regardless of whether the thermodynamically incompatible polymers are virgin materials or scrap polymer materials.

In accordance with one particular illustrative embodiment of the present invention, sorted plastic scrap material comprising a single polymeric composition is solid state shear pulverized in a once-through operation to produce recycled, polymeric particulates (e.g. powder) that are formable to shape by powder feedstock-using melt processing techniques without the need for pelletizing. The sorted scrap material can include polymers of the same composition or type and yet the same or different colors. The pulverized particulates of the invention are melt processable to substantially homogeneous light color without color streaking or the marblizing which was experienced heretofore with other recycling techniques.

In accordance with another particular illustrative embodiment of the present invention, unsorted, commingled plastic scrap materials are solid state shear pulverized to produce recycled, polymeric particulates (e.g. powder) without the need for costly sortation, without the need for pelletization prior to use as feedstock in powder feedstock-using melt processing techniques, and in a manner to achieve in-situ compatibilization of thermodynamically incompatible polymers in a once-through pulverization operation that avoids the need to add a compatibilizing agent. Moreover, commingled, unsorted plastic scrap containing mixed-color scrap polymeric materials can be recycled without sortation to produce recycled, polymeric particulates (e.g., powder) which are melt processable to substantially homogeneous light color articles of manufacture without the color streaking or marbleizing heretofore experienced with other recycling procedures.

As used herein, the term color is intended to have a broad meaning to include usual color hues and white as well as transparent and translucent appearance.

As will become apparent hereinafter, the recycled, polymeric pulverized particulates of the invention produced from sorted or unsorted, commingled scrap materials underwent chemical changes as characterized by DSC (differential scanning calorimetry) and ESR (electron spin resonance spectroscopy). The resulting features are dramatically different from those exhibited by unpulverized flake scrap material of the same composition. Moreover, molded components produced from the pulverized particulates of the invention generally exhibit increased tensile strengths and lack of delamination upon breaking in mechanical testing depending upon the polymer components involved. These characteristics are indicative of in-situ polymer compatibilization.

In practicing the aforementioned illustrative embodiments of the present invention, polymeric scrap material is collected from several recycling centers (e.g. municipal recycling facilities commonly known as MRF's and/or industrial recycling centers). The collected scrap material may be already sorted by polymer type. In this event, each polymer type can be individually pulverized in accordance with the invention.

Alternatively, the collected scrap material may be unsorted and as a result include two or more different polymers which may be thermodynamically incompatible. Moreover, scrap material collected from different centers typically will be at least partially intermixed with scrap material collected from other centers as a result of the usual collection, transportation, storage, and handling procedures for the scrap material prior to recycling. Unsorted, commingled scrap material can result from this situation.

The as-collected scrap material, whether of the sorted or unsorted, commingled type, typically is initially cleaned to remove unwanted contamination. Cleaning of the as-collected scrap material can be effected by water rinsing and/or cleaning solutions to remove contaminants, such as food residue, detergents, oil, and other contaminants. However, the need for and type of cleaning procedure used for initial cleaning of the as-collected scrap material will depend upon the degree and the type of contamination present on the scrap material. Relatively clean as-collected scrap material may not require any cleaning prior to pulverization.

Before or after cleaning, the as-collected, scrap material, whether of the sorted or unsorted, commingled type, initially is comminuted by grinding, chopping or shredding prior to pulverization to provide a polymeric scrap feedstock comprising flakes F. The flakes F typically have sharp, angular surfaces resulting from the comminution operation and usually have different colors with the number of colors present in the scrap feedstock M depending upon the particular composition of the feedstock. The scrap flakes F typically have sizes in the range of 0.10 to 0.30 inches for maximum width dimension and 0.02 to 0.06 inches for thickness dimension, although the as-collected scrap material can be comminuted to other flake sizes and shapes for solid state pulverization pursuant to the invention. A conventional scrap chopping machine of the grinder type can be used in practicing the invention, although other comminuting machines also can be used to this end.

Figure 1B:
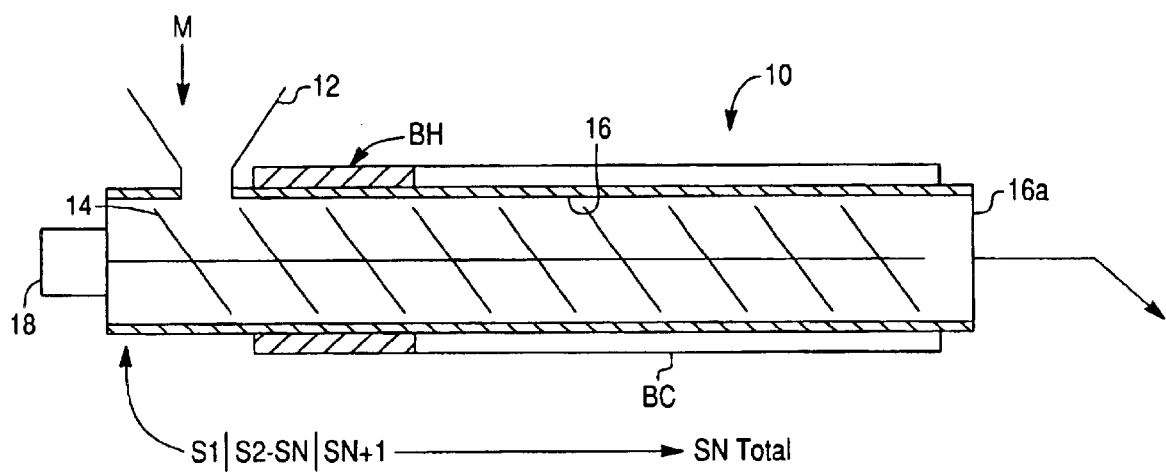
FIG. 1B is a schematic sectional view of a twin-screw extruder for practicing an embodiment of the invention.

The comminuted sorted or unsorted, commingled scrap flakes F are supplied as feedstock to a twin-screw extruder 10 shown schematically in FIG. 1 to effect solid state shear pulverization of the flake scrap material in accordance with the invention. Comminuted unsorted, commingled scrap material from different sources can be fed to the extruder as feedstock. Still further, comminuted unsorted, commingled scrap material from different sources can be fed to the extruder as distinct, sequential feedstocks. Alternatively, comminuted flake scrap material that is sorted so as to have a single polymer composition or generic type (e.g. HDPE, PP, etc.) can be fed to the extruder as feedstock.

The extruder 10 includes a feeder 12 for receiving the polymeric flake scrap feedstock M for transport by the twin screws 14 (only one shown) through the extruder barrel zones S1–SN TOTAL where SN TOTAL corresponds to the total number of extruder zones. The first zone S1 is a material feed zone communicated to the feeder 12. Extruder barrel zones S2–SN each may be heated by external electric heater bands BH on the extruder barrel 16, depending on the composition and degree of crystallization of the scrap components being fed to the extruder. Zones S2–SN are followed by zones SN+1 to SN TOTAL that are cooled by coolant manifold bands or collars BC on the extruder barrel 16 (with the exception of certain barrel throttle zones not shown in FIG. 1 which are air cooled).

Alternately, the extruder barrel zones S2–SN are cooled by coolant bands similar to coolant bands BC followed by the aforementioned cooled downstream extruder zones SN+1-SN TOTAL such that only frictional heating of the scrap material occurs in the extruder. Use of the cooled extruder barrel zones S2–SN TOTAL is preferred to facilitate temperature control of the scrap material during the pulverization operation and to reduce degradation of the polymer and dye or colorant used with the polymers. Energy consumption during the pulverization operation also is reduced compared to conventional scrap batch grinding processes.

In FIG. 1, the flake scrap material feedstock M is supplied by the feeder 12 to the twin-screw extruder 10 having side-by-side, intermeshing, co-rotating screws 14 (only one shown in FIG. 1) in the extrusion barrel 16, although the invention generally envisions using one or more extruder screws to achieve solid state pulverization. The screws 14 are rotated in the same direction by drive motor 18 through a gearbox (not shown) to transport the scrap material along the length of the screws 14 and subject the scrap feedstock to temperature and pressure conditions for a given scrap feed rate effective to achieve solid state shear pulverization thereof (without melting of the polymers) and in-situ compatibilization of any thermodynamically incompatible polymers present in the scrap feedstock, The solid state pulverization avoids melting of the polymeric scrap material in the feedstock but can involve softening of one or more of the polymers in the feedstock.

Uniform pulverized polymeric particulates P (e.g. powder) are discharged at the open (dieless) discharge end 16a of the extruder barrel 16. The pulverized particulates P exhibit differential scanning calorimetry (DSC) and electron spin resonance spectroscopy (ESR) characteristics different from those exhibited by the unpulverized flake scrap feedstock M. Moreover, increased tensile strengths and lack of delamination upon breaking of testing specimens molded from the pulverized powder are further indicative of in-situ polymer compatibilization.

The morphological transformation of the scrap feedstock M, whether of the sorted or unsorted, commingled type, as it is transported through the typical zones S1–SN of the extruder barrel 16 and subjected to solid state shear pulverization therein is illustrated in FIG. 2. For purposes of illustration and not limitation, feedstock M is shown in FIG. 2 including three (3) different flake colors by the three different flake surface shadings shown (i.e. cross-hatched, dotted, and clear flakes).

Referring to FIG. 2, the scrap flakes F are transformed first to large fluff having a particle morphology characterized as fibrous, easily-peeled, laminated particles and substantially homogeneous light color based on a dominant color of a particular scrap component in the feedstock M. During the pulverization process, the flakes F appear to be sheared and deformed into elongated strands. These strands break to form roughly spherical (rounded) particles. The large fluff is further transformed to coarse fluff, fluff, coarse powder and then powder as illustrated in FIG. 2 in dependence on the location of the scrap feedstock along the length of the extrusion screws 14. Both the fluff and powder products of solid state pulverization can find use as feedstock in melt and other polymer processing techniques to form shaped articles of manufacture.

As is apparent, the size of the scrap particulates gets smaller as the feedstock passes along the length of the screws 14. The fragmentation of the feedstock that occurs during pulverization produces powder particles that can be smaller than any of the clearances between barrel and screws of the extruder 10. Moreover, although not apparent from FIG. 2, the color of the scrap particulates typically gets slightly lighter as the feedstock is transported along the length of the screws 14 such that the pulverized powder P has a substantially homogeneous light pastel color tone based on a dominant color of a scrap component in the feedstock. For example, if the feedstock M includes white, blue and orange colored particulate flakes F in equal proportions, the color of the large fluff will be a homogeneous light pastel orange color tone. If the feedstock M includes white, red, blue and yellow colored particulate flakes F in equal proportions, the color of the large fluff will be a homogeneous light pastel rose color tone. As will be explained, the substantially homogeneous light pastel color of the fine recycled polymeric powder persists through subsequent melt processing (e.g. injection molding) to yield a product having a substantially homogeneous, single light pastel color tone without color streaking or marblizing.

The pulverized particulates P (powder particles) have a rounded shape and smooth surfaces which are suggestive of a solid state shearing phenomenon. The powder particles typically have a size of less than about 500 microns. The size range of a particular recycled polymeric powder produced by the invention will depend on composition of the feedstock M, the degree of crystallization of the scrap components of the feedstock M, screw configuration, and the pulverization parameters employed, such as pulverization temperatures, pressures, screw rpm, and feed rates of the feedstock M through the extruder 10.

Importantly, as mentioned, any thermodynamically incompatible polymers present in the feedstock M are in-situ compatibilized during solid state shear pulverization in the extruder 10 as evidenced by production of pulverized polymeric particulates P at the discharge end of the extruder that exhibit DSC and ESR characteristics different from those of the unpulverized flake scrap feedstock M of the same composition. Moreover, the recycled particulates exhibit chemical changes (e.g., enhanced reactivity) as compared to the unpulverized flake scrap feedstock M as indicated by changes in the ESR spectra showing presence of free radicals.

In practicing the invention to achieve solid state shear pulverization of the scrap feedstock M in the manner described hereinabove, the twin-screw extruder 10 can comprise for purposes of illustration and not limitation the model ZE 40A twin-screw extruder (L/D 40.5) manufactured by Hermann Berstorff Maschinenbau GmbH, PO Box 629, D-3000 Hanover I Germany. The ZE 40A twin-screw extruder includes twin, side-by-side intermeshing screws having a modular construction wherein each screw includes a series of standard screw elements mounted end-to-end in a selected sequence on a continuous screw shaft. The screw elements or stages include fluted transport elements, kneading or shearing elements, and spacer elements mounted in a selected sequence on the continuous shaft to accommodate variations in pulverization parameters and feedstock compositions, as necessary. In particular, the screws 14 can be modified by selection of appropriate transport elements, kneading or shearing elements, and spacer elements and their sequential arrangement and element lengths along the axis of the screw shaft.

Moreover, the ZE 40A twin screw extruder includes an extruder barrel 16 having a modular construction wherein a series of standard barrel sections or zones are secured (e.g. bolted) together end-to-end to provide a continuous extruder barrel 16. The barrel sections are adapted to have the electrical heating bands BH or the liquid cooling manifold bands BC mounted thereon for controlling temperature of the extruded material.

The ZE 40A twin screw extruder is described in detail in a product brochure entitled "Berstorff High Performance Twin Screw Extruders ZE*ZE-A*ZE/ZE-A".available from Berstorff Corporation, 8200 Arrowridge Blvd., PO Box 240357, Charlotte, N.C., 28224. In addition, twin screw extruders of this general type are described and shown in U.S. Pat. No. 4,607,797, the teachings of which are incorporated herein by reference.

Figure 3:
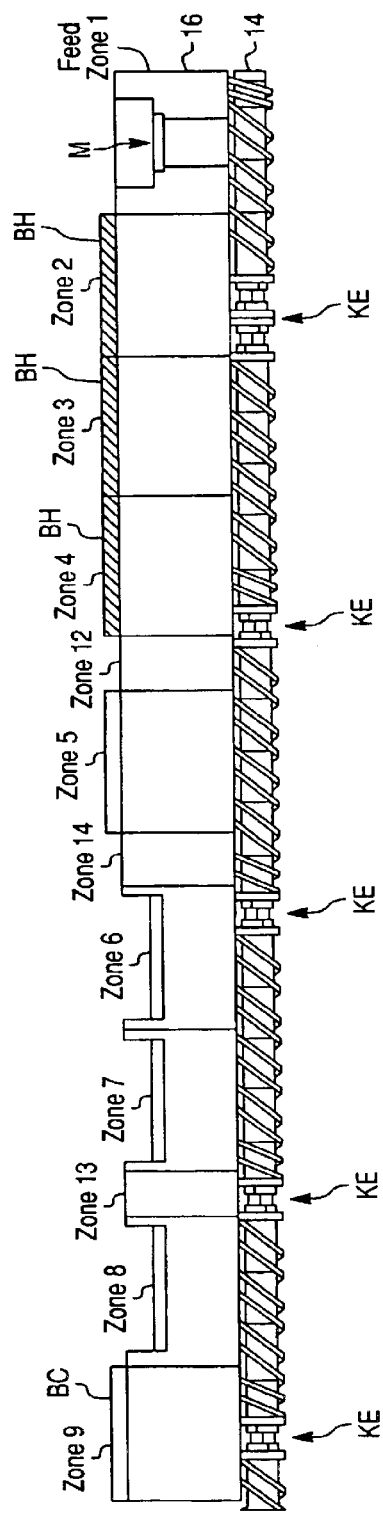
FIG. 3 is an elevational view of a representative screw used in practicing the invention when the scrap material is heated by heater bands on the extruder barrel (partially shown).

FIG. 3 illustrates the extruder barrel and screw configuration used in practicing the aforementioned embodiment of the invention wherein the scrap material is heated in the zones 2–4 by the electrical heating bands BH mounted on those barrel sections or zones. Zones 5–9 are cooled by the coolant manifold bands BC. Barrel throttle zones 12, 13 and 14 are air cooled.

Figure 4:
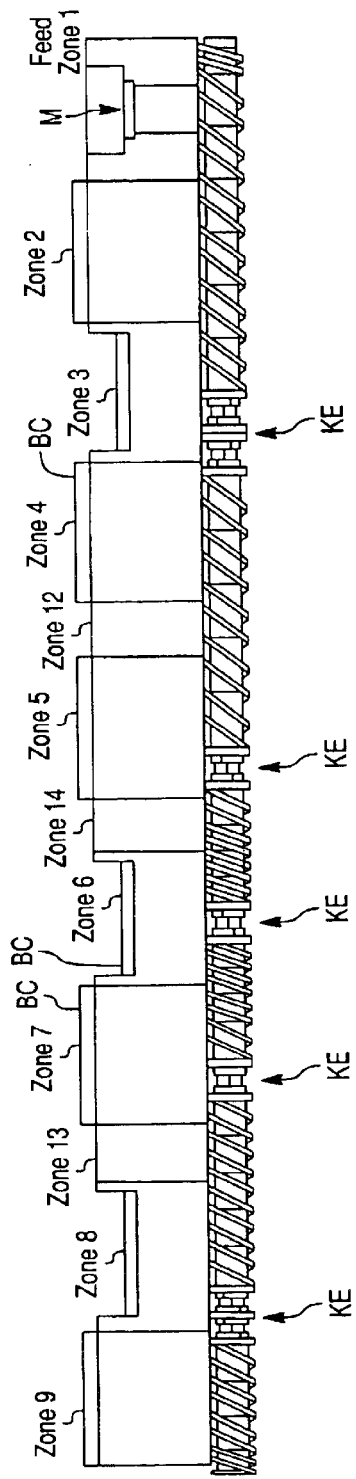
FIG. 4 is an elevational view of a representative screw used in practicing the invention when the scrap material is subjected only to frictional heat in the extruder barrel (partially shown).

FIG. 4 illustrates the extruder barrel and screw configuration used in practicing the aforementioned embodiment of the invention wherein the scrap material is heated only by frictional engagement with the twin screws 14. In FIG. 4, the barrel sections or zones 2–9 are cooled by coolant bands BC disposed thereon. Barrel throttle zones 12, 13 and 14 are air cooled.

Only one screw 14 is shown in FIGS. 3 and 4; however, the other screw 14 is identical and in intermeshing relation thereto as is known and shown in the aforementioned U.S. Pat. No. 4,607,797.

The invention is not to be construed as limited to the particular type or sequence of screw elements and barrel sections shown in FIGS. 3–4 or the particular twin-screw extruder described. Extruder barrel and extruder screw configurations used in practicing the invention can be different from those shown and may depend upon the composition and degree of crystallization of scrap components of the feedstock M as well as other factors in order to achieve solid state shear pulverization and in-situ polymer compatibilization of the feedstock M to pulverized particulates in accordance with the invention.

The scrap feedstock M is subjected to solid state shear pulverization in the extruder 10 in a once-through operation by rotation of the twin screws 14 in the same directions by motor 18 so as to transport the feedstock M along the length of the screws 14 and subject the feedstock M to temperature and pressure conditions (for a given feedstock feed rate through the extruder) effective to achieve solid state shear pulverization (without melting) of the flake-shaped scrap particulates and in-situ polymer compatibilization of thermodynamically incompatible polymers present in the feedstock M. The solid state pulverization avoids melting of the polymeric scrap material in the feedstock but can involve softening of one or more of the polymers in the feedstock.

With respect to the temperature parameter at a given feedstock feed rate, the feedstock M can be heated at extruder barrel sections or zones 2–4 depending upon the composition of the feedstock M followed by cooling in all subsequent barrel zones of the extruder to maintain proper temperature control for solid state pulverization, in-situ polymer compatibilization, if necessary, and production of desired powder size.

Heating of the feedstock M in barrel zones 2–4 is achieved by energization of the electrical heater bands or collars BH mounted on the barrel zones 2–4. Cooling of the feedstock at barrel zones 5–9 is achieved by individual, coolant manifold bands or collars BC mounted on each barrel zone, and supplied (from a common coolant manifold conduit not shown) with a water/glycol mixture that is chilled to nominally 35 degrees F. and pumped by a conventional pump (not shown) at a selected flow rate through the manifold bands BC. Barrel throttle zones 12, 13 and 14 are air cooled by ambient air.

Heating of the scrap feedstock M in barrel zones 2–4 may be effected when pulverizing a feedstock M having a large percentage of amorphous or crystalline scrap polymeric materials. Pulverization occurs in cooled barrel zones where the kneading or shearing elements KE are located. Polymeric material is transported to the kneading or shearing elements by the fluted transport elements appropriately positioned along the lengths of the screws to this end. The screw elements in each zone should be selected appropriately. Spacer elements are used to provide the appropriate screw length for the extruder barrel used.

Preferably, the scrap feedstock M is subjected to only frictional heating in barrel zones 2–4 by engagement with the rotating screws 14. That is, solid state pulverization of the scrap feedstock in barrel zones 2–4 is conducted without heating of the feedstock by external heater bands BH. Instead, all barrel zones 2–9, are cooled by coolant manifold barrels or collars BC disposed on the extruder barrel. Pulverization occurs in cooled barrel zones where the kneading or shearing elements KE are located. This heatless pulverization of the scrap feedstock M is advantageous to reduce heat degradation of the polymers and dyes (or other colorants) present with the polymers. Energy consumption during the pulverization operation also is substantially reduced.

In general, the temperature of the scrap feedstock M is maintained at a level below the melting temperature of the individual scrap components or constituents in the feedstock M at all barrel zones of the extruder 10 regardless of whether barrel zones 2–4 are heated or cooled. In this way, solid state shear pulverization can be conducted in the solid state at all stages of the extruder 10. The temperature of the feedstock M at each stage of the extruder 10 will depend on the particular feedstock composition being pulverized.

For example, scrap feedstock temperatures to achieve solid state shear pulverization will depend upon the ratio of various polymers in the feedstock M. In particular, the feedstock temperature is adjusted to accommodate a relatively high proportion of amorphous, polymeric material (e.g. PS) in the feedstock M. For high proportions (e.g. 70 weight %) of amorphous scrap materials, the temperature used is lower as compared to the feedstock temperatures used to pulverize a feedstock M having a high proportion of crystalline scrap materials (e.g. PP). The feedstock temperature needed for solid state shear pulverization of the feedstock M to powder can be related to glass transition temperature and/or melting temperature for particular feedstock compositions by suitable adjustment to heat output of barrel heater bands BH, if used, and to the coolant flow rate through the extruder coolant manifold bands BC.

Illustrative extruder barrel temperatures at various stages of the extruder 10 are described in certain Examples set forth below for various feedstock compositions for purposes of illustration and not limitation.

With respect to the pulverization pressure and shear rate, the pressure and shear rate are controlled for a given screw design by the torque and rotational speed (rpm) of the motor 18 rotating the screws 14. The pressure and shear forces on the scrap feedstock M are effective for given feedstock temperatures and feed rates to achieve solid state shear pulverization of the flake-shaped scrap particulates in the manner described hereinabove to achieve formation of the rounded powder and in-situ polymer compatibilization. The feedstock pressures and shear rates to achieve solid state shear pulverization will depend upon the ratio of various polymers in feedstock M. For high proportions (e.g. 70 weight %) of amorphous scrap materials, the energy consumption is higher as compared to the feedstock pressures used to pulverize a feedstock M having a high proportion of crystalline scrap materials. The feedstock pressures needed for solid state shear pulverization of the feedstock M to powder can be determined empirically for particular feedstock compositions by suitable adjustment to the torque and rpm of screw drive motor 16 at given feedstock temperatures.

The through-put (e.g. pounds per hour) of the scrap feedstock M through the extruder is controlled in conjunction with temperature and pressure to achieve solid state shear pulverization of the flake-shaped scrap particulates. The through-put for given feedstock temperature/pressure parameters needed for solid state shear pulverization of the feedstock M to fine powder can be determined empirically for particular feedstock compositions by suitable adjustment to the rpm of drive motor 16 for screws 14.

Illustrative through-puts of the scrap feedstock M through the extruder are described in certain Examples set forth below for various feedstock compositions and temperature/pressure parameters for purposes of illustration and not limitation.

By proper selection of the pulverization temperatures, pressures, through-puts, and screw configuration and rpm, pulverized polymeric particulates P (e.g. powder) are discharged at the open (dieless) discharge end 16a (i.e. open end without the usual extrusion die) of the extruder barrel 16. The particulates P typically are discharged onto a conventional endless conveyor (not shown) or other cooling/transport device, such as a spiral cooling device, capable of cooling powders and transporting powders to a storage location. During transport on the conveyor, the recycled pulverized powder can be allowed to cool to ambient temperature preferably in an atmosphere inert to the powder, such as a nitrogen blanket. Use of an inert blanket avoids oxidation of the pulverized powder.

The recycled pulverized particulates P of the invention are made without the need for a compatibilizing agent despite the presence of two or more thermodynamically incompatible polymeric scrap materials in the initial feedstock M. Moreover, the recycled pulverized particulates P of the invention can be directly processed (i.e. without pelletization) by conventional rotational molding, blow molding, extrusion (extruded PVC pipe and profiles), spray coating and other melt processing techniques requiring powder feedstock. Further, the recycled particulates P exhibit enhanced reactivity as compared to the unpulverized scrap feedstock M as measured by ESR. If produced from mixed-color scrap feedstock M, the recycled polymeric particulates, pulverized and as-melt processed, exhibit a substantially homogeneous light pastel color based on a dominant color of a scrap component in the feedstock M, although a color adjustment can be made, if desired, by suitable pigment additive to the feedstock and/or pulverized particulates.

As the Examples below will illustrate, injection molded articles of manufacture produced from the recycled, pulverized particulates P of the present invention exhibit mechanical properties generally superior to those exhibited by like-molded flake scrap polymer feedstock of the same composition and also a substantially homogeneous color characterized by the absence of color streaking or marblizing, despite the powder having originated from mixed-color scrap feedstock. The homogenous color of molded articles produced from the pulverized particulates is quite surprising and unexpected given the mixed-color nature of the initial feedstock M, and given the mixed-color which is typically exhibited by products of melt processing such mixed-color feedstock M. The Examples set forth hereinbelow illustrate these advantageous features of the invention.

Importantly, the recycled, pulverized particulates P of the invention can be used in molding a plurality of articles that exhibit substantially the same homogeneous pastel color from one molded article to the next as illustrated in the following Examples. In contrast, a mixture of flake scrap of like composition and mixed color produce molded articles exhibiting inconsistent colors from one molded article to the next.

The recycled particulates P of the invention also can be used in conventional coating procedures wherein powdered coating feedstock is used. For example, the recycled powder can be used as feedstock in coating processes, such as thermal spray, to produce homogeneously colored, thin coatings on various substrates.

The following Examples are offered for purposes of illustrating the invention in greater detail without in any way limiting the invention. These Examples involve sorted, washed, and chopped polymeric post-consumer flake scrap material obtained from several recycling sources throughout the United States; namely, HDPE and chopped LDPE flake scrap was obtained from St. Joseph Plastics in St. Joseph, Mo.; chopped PP scrap flake was obtained from SEI Recycling in Burlington, Wis.; and chopped PET scrap flake was obtained from Plastic Recyclers Southeast, Inc. in Athens, Ala. These scrap materials were obtained in 700 pound quantities. PVC scrap in flake form was obtained from Oxychem Corp. in Dallas, Tex. PS scrap in flake form was obtained from Maine Plastics in North Chicago, Ill.

Various proportions of these scrap materials were dry blended in order to simulate typical scrap feedstock compositions that would be encountered in the recycling of plastic scrap from municipal collection centers and industrial collection centers. Binary, ternary, and quaternary blends of different polymeric scrap materials were simulated (See TABLE II below). The scrap components of the dry blends are based on weight percentages of the components involved. Various mechanical property test specimens were prepared by injection molding 1) the as-received individual flake scrap materials and their blends (referred to as "Flake" in Table II below) and 2) the pulverized powder P of the invention (referred to as "Pulverized" or "Pulv" in Table II below). A 4-cavity MUD family mold was used for injection molding with a 1 oz. Battenfield injection molding machine. Specimens were of the standard ASTM "dog bone" shape, approximately 5 inches long and 0.125 inch thick. Izod bars (2.5 inches long and 0.125 inch thick) and five-inch heat distortion temperature (HDT) bars were also similarly molded.

The injection molded specimens were used in the indicated ASTM tests of tensile strength/elongation (D638), notched Izod impact strength (D256), heat distortion temperature measurements (D648), and Shore D hardness (D2240). Tensile strengths are reported as ultimate tensile strengths for most specimens (yield strength being reported for the LDPE and PP specimens).

Tensile tests were measured with an Instron test machine (crosshead speed=2 inches/minute, gauge length=2.25 inches, strain rate=0.9 in./in.-min.). Elongations are reported at the breaking point.

EXAMPLE 1

The aforementioned chopped PP scrap flakes (obtained from SEI Recycling in Burlington, Wis.) were solid state pulverized using the aforementioned ZE40A twin screw extruder. A sample of the scrap flakes is shown in FIG. 5A prior to solid state pulverization in accordance with the invention. Although the flakes all comprised PP, they were of mixed-colors; i.e. white and taupe flakes, red flakes, yellow flakes, blue flakes and a small amount of black flakes.

The PP scrap flake feedstock was solid state pulverized pursuant to the embodiments of the invention described above wherein in one trial, there was no external heating of the scrap flakes in the extruder (i.e. heatless embodiment) and wherein the heater bands BH were energized to heat the scrap flakes in barrel zones 2–4 (i.e. externally heated embodiment).

TABLE I below sets forth the temperature, rpm (for motor 18), and scrap through-put employed in the trials to solid state pulverize the PP scrap flake feedstock. Both the extruder control set temperature and measured temperature of the scrap in the extruder are shown in TABLE I. As is apparent, the trial wherein there was no external heating ("No heat") involved higher scrap temperatures, lower motor rpm and higher scrap through-put than when heater bands BH were used to heat the scrap flakes ("w/heat"). Pressure in the extruder was not measured in the Examples.

With respect to the configuration of the twin screws 14, the heatless trial used the screw configuration shown in FIG. 4. The externally heated trial used the screw configuration shown in FIG. 3.

FIG. 5A shows the flake scrap feedstock and an injection molded specimen made therefrom. FIG. 5B shows the pulverized powder of the invention made with external heating and an injection molded specimen made therefrom.

FIGS. 5A and 5B illustrate that the pulverized powder of the invention made without external heating comprised fine powder particles having a homogeneous light mauve color as opposed to the mixed-color scrap flakes. Moreover, the injection molded pulverized powder specimen exhibited a substantially homogeneous, slightly more intense mauve color without color streaking or marblizing. In contrast, the injection molded scrap flakes exhibited a non-uniform color with color streaking and marblizing throughout the specimen, FIG. 5A.

The pulverized powder of the invention made without external heating of the extruder barrel zones (all barrel zones cooled) exhibited a similar morphology and a uniform purple/cranberry color. The injection molded shape made from this powder exhibited a substantially homogeneous, slightly more intense cranberry color without color streaking or marblizing.

The mechanical properties measured from the aforementioned injection molded dog bone specimens made from the PP scrap flake feedstock and PP pulverized powder are set forth in TABLE II. These mechanical properties are discussed below.

EXAMPLE 2

The aforementioned chopped HDPE scrap flakes (obtained from St. Joseph's Plastics St. Joseph, Mo.) were solid state pulverized using the aforementioned ZE 40A twin screw extruder. Although the flakes all comprised HDPE, they were of mixed-colors; i.e. white and taupe flakes, green flakes, blue flakes, and small amount of yellow flakes.

The HDPE scrap flake feedstock was solid state pulverized pursuant to the embodiments of the invention described above wherein in one trial, there was no external heating of the scrap flakes in the extruder (i.e. heatless embodiment) and wherein the heater bands BH were energized to heat the scrap flakes in barrel zones 2–4 (i.e. externally heated embodiment).

TABLE I below sets forth the temperature, rpm (for motor 18), and through-put employed in the trials to solid state pulverize the HDPE scrap flake feedstock. The heatless trial used the screw configuration shown in FIG. 4. The externally heated trial used the screw configuration shown in FIG. 3.

The recycled pulverized HDPE powder made from the scrap flake feedstock without external heating exhibited a light blue-green color and powder morphology. The pulverized HDPE powder produced with external heating was similar in morphology but had a somewhat lighter green-blue color.

The injection molded pulverized HDPE powder specimens exhibited a substantially homogeneous, slightly more intense colors without color streaking or marbleizing. In contrast, the injection molded scrap HDPE flakes exhibited a uniform whitest color.

The mechanical properties measured from the aforementioned injection molded dog bone specimens made from the HDPE scrap flake feedstock and HDPE pulverized powder are set forth in TABLE II and are discussed below.

EXAMPLE 3

The aforementioned chopped LDPE scrap flakes (obtained from St. Joseph's Plastics St. Joseph, Mo.) were solid state pulverized using the aforementioned ZE 40A twin screw extruder. Although the flakes all comprised LDPE, they were of mixed-colors; i.e. white flakes, beige flakes, red flakes, and blue flakes.

The LDPE scrap flake feedstock was solid state pulverized pursuant to the embodiments of the invention described above wherein in one trial, there was no external heating of the scrap flakes in the extruder (i.e. heatless embodiment) and wherein the heater bands BH were energized to heat the scrap flakes in barrel zones 2–4 (i.e. externally heated embodiment).

TABLE I below sets forth the temperature, rpm (for motor 18), and through-put employed in the trials to solid state pulverize the LDPE scrap flake feedstock. The heatless trial used the screw configuration shown in FIG. 4. The externally heated trial used the screw configuration shown in FIG. 3.

The recycled pulverized LDPE powder made from the scrap flakes without external heating exhibited a uniform light beige color and powder morphology. The pulverized LDPE powder made using external extruder barrel heating was a homogeneous light orange-beige color with similar morphology.

The injection molded pulverized LDPE powder specimen exhibited a substantially homogeneous, slightly more intense beige color (heatless), or orange-beige color (with external barrel heating), without color streaking or marblizing. The injection molded scrap LDPE flakes exhibited a uniform burnt orange color.

The mechanical properties measured from the aforementioned injection molded dog bone specimens made from the LDPE scrap flake feedstock and LDPE pulverized powder are set forth in TABLE II and are discussed below.

EXAMPLE 4

The aforementioned chopped HDPE, LDPE and PP scrap flakes were mixed to simulate a scrap feedstock comprising 60 weight % HDPE, 30 weight % LDPE and 10 weight % PP flakes. The feedstock was solid state pulverized using the aforementioned ZE 40A twin screw extruder. The HDPE/LDPE/PP scrap flake feedstock comprised mixed-colors; i.e. white flakes, red flakes, sky blue flakes, and orange flakes. FIG. 6A illustrates the HDPE/LDPE/PP scrap flake feedstock.

The HDPE/LDPE/PP scrap flake feedstock was solid state pulverized pursuant to the embodiment of the invention described above wherein the heater bands BH were energized to heat the scrap flakes in barrel zones 2–4 (i.e. externally heated embodiment). The screw configuration shown in FIG. 3 was used.

The recycled pulverized HDPE/LDPE/PP powder made from the scrap flake feedstock is shown in FIG. 6B. The pulverized powder was a homogeneous light pastel rose color.

The injection molded pulverized HDPE/LDPE/PP powder specimen exhibited a substantially homogeneous, slightly more intense pastel rose color without color streaking or marbleizing, FIG. 6B. In contrast, the injection molded scrap HDPE/LDPE/PP flake feedstock exhibited a non-uniform, streaky beige/pink color, FIG. 6A.

The mechanical properties measured from the aforementioned injection molded dog bone specimens made from the HDPE/LDPE/PP scrap flake feedstock and HDPE/LDPE/PP pulverized powder are set forth in TABLE II and are discussed below.

EXAMPLE 5

The aforementioned chopped HDPE and PP scrap flakes were mixed to simulate a scrap feedstock comprising 70 weight % HDPE and 30 weight % PP flakes. The feedstock was solid state pulverized using the aforementioned ZE 40A twin screw extruder. The HDPE/PP scrap flake feedstock comprised mixed-colors; i.e. white and taupe flakes, green flakes, red flakes, dark blue flakes, and small amounts of yellow flakes and black flakes. FIG. 7A illustrates the HDPE/PP scrap flake feedstock.

The HDPE/PP scrap flake feedstock was solid state pulverized pursuant to the embodiment of the invention described above wherein the heater bands BH were energized to heat the scrap flakes in barrel zones 2–4 (i.e. externally heated embodiment). The screw configuration shown in FIG. 3 was used.

The recycled pulverized HDPE/PP powder made from the scrap flake feedstock is shown in FIG. 7B. The pulverized powder was a homogeneous light pastel rose color.

Moreover, the injection molded pulverized HDPE/PP powder specimen exhibited a substantially homogeneous, slightly more intense pastel rose color without color streaking or marblizing, FIG. 7B. In contrast, the injection molded scrap HDPE/PP flake feedstock exhibited a non-uniform, streaky green/pink color, FIG. 7A.

The mechanical properties measured from the aforementioned injection molded dog bone specimens made from the HDPE/PP scrap flake feedstock and HDPE/PP pulverized powder are set forth in TABLE II and are discussed below.

EXAMPLE 6

The aforementioned chopped HDPE and PP scrap flakes were mixed to simulate a scrap feedstock comprising 90 weight % HDPE and 10 weight % PP flakes. The feedstock was solid state pulverized using the aforementioned ZE 40A twin screw extruder. The HDPE/PP scrap flake feedstock comprised mixed-colors; i.e. white and taupe flakes, green flakes, red flakes, dark blue flakes, and small amounts of yellow flakes. The quantity of red flakes present was less than that in scrap flake feedstock of Example 4. FIG. 8A illustrates the HDPE/PP scrap flake feedstock.

The HDPE/PP scrap flake feedstock was solid state pulverized pursuant to the embodiments of the invention described above wherein the heater bands BH were energized to heat the scrap flakes in barrel zones 2–4 (i.e. externally heated embodiment). The screw configuration shown in FIG. 3 was used.

The recycled pulverized HDPE/PP powder made from the scrap flake feedstock is shown in FIG. 8B. The pulverized powder was a homogeneous light pastel green color.

Moreover, the injection molded pulverized HDPE/PP powder shape exhibited a substantially homogeneous, slightly more intense pastel green color without color streaking or marbleizing, FIG. 8A. In contrast, the injection molded scrap HDPE/PP flakes exhibited a nonuniform, streaky green/pink color, FIG. 8A.

The mechanical properties measured from the aforementioned injection molded dog bone specimens made from the HDPE/PP scrap flake feedstock and HDPE/PP pulverized powder are set forth in TABLE II and are discussed below.

EXAMPLE 7

The aforementioned chopped HDPE and LDPE scrap flakes were mixed to simulate a scrap feedstock comprising 40 weight % HDPE and 60 weight % LDPE flakes. The feedstock was solid state pulverized using the aforementioned ZE 40A twin screw extruder. The HDPE/PP scrap flake feedstock comprised mixed-colors; i.e. white flakes, green flakes, blue flakes, red flakes, and small amounts of yellow flakes.

The HDPE/LDPE scrap flake feedstock was solid state pulverized pursuant to the embodiments of the invention described above wherein all barrel zones were cooled by collars BC.

TABLE I below sets forth the temperature, rpm (for motor 18), and through-put employed in the trials to solid state pulverize the feedstock. The screw configuration shown in FIG. 4 was used. The recycled pulverized HDPE/LDPE powder made from the scrap flake feedstock was a homogeneous light pastel peach color.

Moreover, the injection molded pulverized HDPE/LDPE powder shape exhibited a substantially homogeneous, slightly more intense light pastel peach color without color streaking or marblizing. In contrast, the injection molded scrap HDPE/LDPE flakes exhibited a non-uniform, streaky beige/brown color.

The mechanical properties measured from the aforementioned injection molded dog bone specimens made from the HDPE/LDPE scrap flake feedstock and HDPE/LDPE pulverized powder are set forth in TABLE II and are discussed below.

TABLE I

| Plastic | | 1 | 2 | 3 | 4 | 5 | 6 | 7 | 8 | 9 | 10 | 11 |
|---|---|---|---|---|---|---|---|---|---|---|---|---|
| | | | | | | Barrel zone temperature, ° C. | | | | | | |
| | | | | | | S = Set   A = Actual | | | | | | |
| PP | A | — | 19 | 87 | 54 | 31 | 52 | 38 | 24 | 18 | | |
| No heat | S | — | 0 | 0 | 0 | 0 | 0 | 0 | 0 | 0 | | |
| PP | A | 19 | 224 | 220 | 221 | 152 | 92 | 85 | 54 | 33 | | |
| W/heat | S | 0 | 220 | 230 | 220 | 0 | 0 | 0 | 0 | 0 | | |
| HDPE | A | — | 14 | 71 | 32 | 19 | 32 | 30 | 18 | 15 | | |
| No heat | S | — | 0 | 0 | 0 | 0 | 0 | 0 | 0 | 0 | | |
| HDPE | A | 18 | 120 | 120 | 122 | 117 | 88 | 74 | 47 | 29 | | |
| W/heat | S | 0 | 125 | 125 | 125 | 0 | 0 | 0 | 0 | 0 | | |
| LDPE | A | — | 26 | 67 | 47 | 27 | 43 | 29 | 21 | 17 | | |
| No heat | S | — | 0 | 0 | 0 | 0 | 0 | 0 | 0 | 0 | | |
| LDPE | A | 19 | 159 | 158 | 178 | 139 | 80 | 60 | 44 | 27 | | |
| W/heat | S | 0 | 175 | 175 | 175 | 0 | 0 | 0 | 0 | 0 | | |
| HDPE/LDPE 40/60 | A | 19 | 175 | 179 | 159 | 53 | 30 | 21 | 19 | 17 | | |
| W/heat | S | 0 | 175 | 175 | 160 | 0 | 0 | 0 | 0 | 0 | | |

TABLE I-continued

| Plastic | | Barrel zone temperature S = Set A = Actual | | | | Color | |
|---|---|---|---|---|---|---|---|
| | | 12 | 13 | 14 | RPN | Motor Powder | Injection molded samples |
| HDPE/LDPE 40/60 | A | — 75 21 26 20 21 21 14 15 | | | | | |
| No heat | S | — 0 0 0 0 0 0 0 0 | | | | | |
| PP | A | 52 | 43 | 31 | 150 | light mauve | more intense |
| No heat | S | 0 | 0 | 0 | | | (deeper) mauve |
| PP | A | 179 | 99 | 60 | 40 | cranberry | more intense |
| W/heat | S | 0 | 0 | 0 | | | (deeper) cranberry |
| HDPE | A | 0 | 0 | 0 | 20 | light green/blue | more intense |
| No heat | S | 0 | 0 | 0 | | | (deeper) green/blue |
| HDPE | A | 119 | 91 | 51 | 40 | blue/green | more intense |
| W/heat | S | 0 | 0 | 0 | | | (deeper) blue/green |
| LDPE | A | 40 | 36 | 28 | 80 | light beige | more intense |
| No heat | S | 0 | 0 | 0 | | | (deeper) beige |
| LDPE | A | 167 | 97 | 55 | 40 | orange/beige | more intense |
| W/heat | S | 0 | 0 | 0 | | | (deeper) orange/beige |
| HDPE/LDPE 40/60 | A | 107 | 27 | 31 | 20 | light peach | light peach |
| W/heat | S | 0 | 0 | 0 | | | |
| HDPE/LDPE 40/60 | A | 22 | 22 | 26 | 113 | light peach | light peach |
| No heat | S | 0 | 0 | 0 | | | |

PP = Polypropylene
HDPE = High Density Polyethylene
LDPE = Low Density Polyethylene

OTHER EXAMPLES

The aforementioned chopped scrap flakes alone or mixed together were used to simulate other scrap feedstocks listed in TABLE II below. Each simulated scrap flake feedstock was solid state pulverized using the aforementioned ZE 40A twin screw extruder. The scrap flake feedstocks-of all Examples comprised mixed-colors in various combinations of color.

The scrap flake feedstocks were solid state pulverized pursuant to the embodiments of the invention described above wherein in one trial, there was no external heating of the scrap flakes in the extruder (i.e. heatless embodiment) and wherein the heater bands BH were energized to heat the scrap flakes in barrel zones 2–4 (i.e. externally heated embodiment). The heatless trials are designated "No heat pulv" in TABLE II and used the screw configuration shown in FIG. 4. The externally heated trials are designated by the absence of "No heat pulv" and used the screw configuration shown in FIG. 3. In Table II, Examples 1–7 are identified by the example number in parenthesis in the left-hand column.

The temperature, rpm (for motor 18), and throughput employed in the trials were selected empirically to achieve solid state pulverization. The temperature, motor rpm and through-put used were generally in the same ranges as those described above in Examples 1–3 and 7 for the heatless and externally heated trials.

In Other Examples, molded specimens prepared from the pulverized powder of the invention exhibited a surprisingly and extremely uniform light pastel color based on a dominant color scrap component in the feedstock. The achievement of the uniform, light pastel color was surprising and unexpected, given the mixed-color nature of most of the initial scrap flake feedstocks used.

In contrast, the color of molded specimens prepared from the as-received flake feedstocks exhibited a streaking or marblizing effect with the presence of light and dark color swirling patterns readily apparent.

Specimens molded from pulverized feedstocks including both PET and PVC were the only exceptions to achievement of a light pastel molded color. The molded specimens containing both PET and PVC exhibited a homogenous color that was darker than the pastel color tone observed with the other specimens containing either PET or PVC.

All of the specimens molded from the pulverized powder of the invention exhibited a very smooth, homogenous colored surface. In contrast, the specimens molded from the as-received flake feedstocks exhibited a non-uniform, streaky surface.

It is noteworthy that even though some of the scrap feedstock set forth in Examples 7–25 comprised a plurality of polyolefins (e.g. HDPE, LDPE, PP) that are mutually thermodynamically incompatible, these feedstocks were nevertheless successfully injection molded.

TABLE II (which follows this paragraph) summarizes the measured mechanical properties and thermal properties specimens of Examples 1–7 and the aforementioned Other Examples molded from as-received flake feedstocks (Flake) and pulverized powder P of the invention (Pulverized or Pulv).

TABLE II

| Materials | Tensile Properties | | | Notched Izod Impact Ft-Lb/In | HDT Deg. C. 66 PSI | Shore D |
|---|---|---|---|---|---|---|
| | Yield PSI | Ultimate PSI | % Elong | | | |
| PP Flake (1) | 4840 | | 330 | 0.7 | 102 | 72 |
| PP Pulverized (1) | 4730 | | 100 | 0.8 | 93 | 72 |
| PP-No heat pulv (1) | 5060 | | 300 | 0.6 | 97 | 74 |
| HDPE Flake (2) | | 3240 | 12 | 0.5 | 60 | 63 |
| HDPE Pulverized (2) | | 2870 | 7.5 | 0.5 | 60 | 63 |
| HDPE--No heat pulv (2) | | 3400 | 14 | 0.5 | 57 | 57 |
| LDPE Flake (3) | 1980 | | 33 | 0.8 | 49 | 56 |
| LDPE Pulverized (3) | 2060 | | 60 | 0.7 | 50 | 57 |
| LDPE--No heat pulv (3) | 2060 | | 32 | 0.7 | 49 | 57 |
| HDPE/LDPE/PP 60/30/10 Flake (4) | | 2680 | 9 | 0.4 | 58 | 62 |
| HDPE/LDPE/PP 60/30/10 Pulv (4) | | 2970 | 9 | 0.4 | 58 | 64 |
| HDPE/PP 70/30 Flake (5) | | 3740 | 11 | 0.4 | 68 | 67 |
| HDPE/PP 70/30 Pulv (5) | | 3850 | 12 | 0.4 | 68 | 67 |
| HDPE/PP 90/10 Flake (6) | | 3530 | 13 | 0.4 | 67 | 66 |
| HDPE/PP 90/10 Pulv (6) | | 3480 | 12 | 0.4 | 63 | 65 |
| HDPE/LDPE 40/60 Pulv (7) | | 2550 | 15 | 0.6 | 45 | 59 |
| HDPE/PET 50/50 Flake | | 3710 | 6 | 0.7 | 70 | 68 |
| HDPE/PET 50/50 Pulv | | 3600 | 4 | 0.5 | 70 | 69 |
| HDPE/PET 60/40 Flake | | 2870 | 4 | 0.4 | 72 | 68 |
| HDPE/PET 60/40 Pulv | | 2790 | 3 | 0.2 | 70 | 68 |
| HDPE/PET 40/60 Flake | | 4680 | 7 | 1.1 | 69 | 71 |
| HDPE/PET 40/60 Pulv | | 4100 | 5 | 0.7 | 68 | 70 |
| HDPE/LDPE/PET 30/30/40 Flake | | 2010 | 4 | 0.4 | 42 | 64 |
| HDPE/LDPE/PET 30/30/40 Pulv | | 2520 | 5 | 0.3 | 62 | 65 |
| HDPE/LDPE/PET 40/30/30 Flake | | 1880 | 4 | 0.3 | 63 | 64 |
| HDPE/LDPE/PET 40/30/30/Pulv | | 2450 | 5 | 0.2 | 63 | 66 |
| HDPE/LDPE/PET 60/10/30 Flake | | 2330 | 4 | 0.3 | 67 | 66 |
| HDPE/LDPE/PET 60/10/30 Pulv | | 3020 | 50 | 0.2 | 67 | 68 |
| HDPE/LDPE 40/60 Flake | | 2530 | 17 | 0.5 | 47 | 69 |
| HDPE/LDPE 40/60--No heat pulv | 2500 | | 90 | 0.6 | 51 | 60 |
| HDPE/LDPE 60/40 Flake | | 2840 | 13 | 0.4 | 57 | 63 |
| HDPE/LDPE 60/40 Pulv | | 2860 | 13 | 0.5 | 57 | 63 |
| PP/PS 70/30 Flake | 6320 | | 16 | 0.6 | 93 | 76 |
| PP/PS 70/30 Pulv | 6120 | | 10 | 0.4 | 90 | 76 |
| PP/PS 70/30--No heat pulv | | 6200 | 8 | 0.4 | 91 | 76 |
| PP/PS 30/70 Flake | | 6880 | 5 | 0.6 | 90 | 79 |
| PP/PS 30/70 Pulv | | 6780 | 4 | 0.45 | 88 | 79 |
| PP/PS 30/70-No heat pulv | | 6960 | 6 | 0.4 | 90 | 80 |
| HDPE/LDPE/PP/PET 40/30/10/20 Flake | | 2300 | 6 | 0.2 | 69 | 65 |
| HDPE/LDPE/PP/PET 40/30/10/20 Pulv | 2710 | | 10 | 0.3 | 69 | 65 |
| HDPE/LDPE/PP/PET/PS 40/30/5/20/5 Flake | | 2020 | 4 | 0.2 | 63 | 64 |
| HDPE/LDPE/PP/PET/PS 40/30/5/20/5 Pulv | | 2610 | 8 | 0.2 | 64 | 64 |
| HDPE/LDPE/PP/PVC 55/30/10/5 Flake | | 2540 | 7 | 0.3 | 55 | 63 |
| HDPE/LDPE/PP/PVC 55/30/10/5 Pulv | | 2390 | 6 | 0.3 | 65 | 63 |

TABLE II-continued

|  | Tensile Properties | | | | HDT | |
|---|---|---|---|---|---|---|
| Materials | Yield PSI | Ultimate PSI | % Elong | Notched Izod Impact Ft-Lb/In | Deg. C. 66 PSI | Shore D |
| HDPE/LDPE/PP/PET/PVC 40/30/5/20/5 Pulv |  | 2290 | 6 | 0.2 | 65 | 65 |
| HDPE/LDPE/PP/PET/PS/PVC 40/30/5/25/5/5 Pulv |  | 2210 | 6 | 0.2 | 61 | 65 |

It is noteworthy that the tensile strengths of injection molded specimens made from pulverized ternary HDPE/LDPE/PP and HDPE/LDPE/PET powder of the invention are consistently higher than the tensile strengths of molded specimens molded from the as-received blended flake feedstocks of the same materials. This increase in tensile strength for the pulverized powder molded specimens indicates an increased compatibility of the polymer components in the blend.

It is further noteworthy that even though some of the scrap feedstocks set forth in the Examples comprised a plurality of polyolefins (e.g. HDPE, LDPE, PP) that are mutually thermodynamically incompatible, the feedstocks were nevertheless successfully injection molded, and the molded specimens did not exhibit delamination upon breaking in the mechanical property tests, indicating that chemical change occurred during pulverization and the polymers have been in-situ compatibilized during the solid state shear pulverization process of the invention.

Furthermore, as mentioned above, the pulverized recycled powders of the invention exhibited enhanced reactivity as compared to the flake feedstock M prior to pulverization. To facilitate studies of the chemical state (reactivity) of the pulverized powder, small samples (2–3 grams) of powder were collected from the discharge end of the extruder barrel.

Powder samples were loaded into quartz tubes for electron spin resonance (ESR) measurements. ESR spectra were acquired at room temperature on a modified continuous wave Varian E-4 spectrometer operating in the X-band (microwave frequency near 9 GHz).

Initial ESR studies were made of unpulverized flake LDPE and pulverized LDPE powder of the invention pulverized from the flake in accordance with the invention. It appears that reactive sites (free radicals) are formed by polymer bond rupture during the solid state shear pulverization process and have lifetimes that can be estimated as several hours at ambient conditions. In general, ESR spectra of unpulverized feedstock flakes and pulverized powder stored at ambient conditions indicate the presence of stable peroxy radicals in both the LDPE, PP, and 70% HDPE/30% PP flakes and powder. However, the pulverized powders have greater free radical densities than the as-received (unpulverized) flakes in accordance with the invention, as shown in FIGS. 9, 10 and 11.

In FIG. 11, a simulated ESR spectrum for unpulverized mixture of 70% HDPE/30% PP at room temperature is shown at the top. At the bottom, a simulated ESR spectrum of an incompatible blend of pulverized 70% HDPE/30% PP superimposed over an actual measured ESR spectrum of these pulverized blends are shown at the bottom. All spectra were normalized to the same mass. The simulated spectrum is determined by adding spectra of the individual blend components, each scaled according to their fraction in the blend. Because the actual spectrum is larger (more intense) than the simulated one, it implies an interaction between HDPE and PP during the pulverization process.

Furthermore, differential scanning calorimetry (DSC) using a Perkin-Elmer DSC-7 unit provided unambiguous evidence that solid state shear pulverization in accordance with the invention produces significant chemical changes suggesting a compatibilizing effect. Dramatic changes in the melting and crystallization peaks of HDPE/LDPE and HDPE/PP blends were observed after pulverization of dry blends of these incompatible polyolefins, as shown in FIGS. 12–18.

Table III (which follows this paragraph) summarizes the DSC results. In Table III, F adjacent the material refers to post-consumer unpulverized flake or chunk material and Pul refers to pulverized material.

TABLE III

| MELTING | | | | | CRYSTALLIZATION | | |
|---|---|---|---|---|---|---|---|
| Material Sample ID Mass (mg) Description | Onset Tm (° C.) | Peak Tm (° C.) | Delta H (μg) | Onset Tc (° C.) | Peak Tc (° C.) | Delta H (μg) |
| THERMAL HISTORY: ORIGINAL | | | | | | |
| LDPE-F | 122.269 | 126.828 | 78.239 | 114.402 | 111.047 | −108.103 |
| LDPE-Pul | 125.187 | 129.128 | 75.209 | 117.334 | 116.295 | −108.787 |
| HDPE-F | 123.944 | 131.527 | 162.512 | 117.693 | 114.271 | −159.981 |
| HDPE-Pul | 124.818 | 128.568 | 158.309 | 116.730 | 124.948 | −162.713 |
| PP-F | 153.063 | 163.379 | 76.431 | 127.389 | 121.691 | −93.975 |
| PP-Pul | 152.378 | 162.793 | 88.787 | 122.751 | 120.068 | −89.813 |
| PP-Pul | 156.863 | 168.022 | 76.919 | 124.834 | 121.69 | −81.76 |
| THERMAL HISTORY: COOLED AT 10° C./min. | | | | | | |
| LDPE-F | 122.769 | 126.828 | 78.239 | | | |
| LDPE-Pul | 124.392 | 128.161 | 90.659 | | | |
| HDPE-F | 123.679 | 131.895 | 190.123 | | | |
| HDPE-Pul | 121.573 | 127.777 | 158.829 | | | |

TABLE III-continued

| | | | |
|---|---|---|---|
| PP-F | 153.852 | 162.61 | 83.58 |
| PP-Pul | 149.058* | 160.175* | 76.933 |
| PP-Pul | 159.196* | 164.461* | 63.727 |

| Material (Composition) | Peak | Onset Tm (° C.) | Peak Tm (° C.) | Delta H (μg) | Onset Tc (° C.) | Peak Tc (° C.) | Delta H (μg) |
|---|---|---|---|---|---|---|---|
| THERMAL HISTORY: ORIGINAL | | | | | | | |
| HDPE/PP (70/30)-F | HDPE | 123.426 | 130.08 | 170.703 | 118.125 | 114.185 | −140.942 |
| | PP | 152.397 | 162.927 | 71.215 | 129.06 | 125.37 | −49.51 |
| HDPE/PP (70/30)-Pul | HDPE | 121.779 | 128.673 | 174.088 | 116.975 | 114.847 | −158.279 |
| | PP | 151.299 | 162.454 | 75.882 | 125.387 | 122.342 | −81.961 |
| HDPE/LDPE/PP (60/30/10)-F | HDPE/LDPE | 124.153 | 134.265 | 154.237 | 118.401 | 115.866 | −179.578 |
| | PP | 158.104 | 163.738 | 49.94 | No polypropylene crystallization peak observed | | |
| HDPE/LDPE/PP (60/30/10)-Pul | HDPE/LDPE | 123.399 | 129.199 | 169.264 | 118.659 | 116.957 | −134.321 |
| | PP | 162.287 | 167.359 | −109.55 | 127.829 | 124.952 | −74.87 |
| HDPE/LDPE (40/60)-F | HDPE/LDPE | 122.419 | 127.927 | 108.524 | 118.42 | 184.588 | −123.248 |
| HDPE/LDPE (40/60)-Pul | HDPE/LDPE | 121.257 | 128.404 | 114.058 | 117.351 | 115.394 | −115.204 |
| HDPE/LDPE (60/40)-F | HDPE/LDPE | 124.538 | 131.64 | 123.379 | 116.939 | 114.582 | −132.588 |
| HDPE/LDPE (60/40)-Pul | HDPE/LDPE | 122.887 | 127.89 | 110.815 | 117.671 | 115.784 | −107.01 |
| THERMAL HISTORY: COOLED AT 10° C./min. | | | | | | | |
| HDPE/PP (70/30)-F | HDPE | 122.164 | 128.008 | 183.304 | | | |
| | PP | 149.671 | 160.991 | 68.5 | | | |
| HDPE/PP (70/30)-Pul | HDPE | 121.188 | 128.182 | 188.188 | | | |
| | PP | 155.211 | 160.271 | 77.159 | | | |
| HDPE/LDPE/PP (60/30/10)-F | HDPE/LDPE | 124.856 | 132.306 | 165.523 | | | |
| | PP | 155.903 | 161.912 | 70.06 | | | |
| HDPE/LDPE/PP (60/30/10)-Pul | HDPE/LDPE | 123.706 | 128.93 | 154.731 | | | |
| | PP | 158.317 | 161.036 | 58.84 | | | |
| HDPE/LDPE (40/60)-F | HDPE/LDPE | 120.073 | 127.669 | 108.399 | | | |
| HDPE/LDPE (40/60)-Pul | HDPE/LDPE | 122.691 | 127.973 | 107.069 | | | |
| HDPE/LDPE (60/40)-F | HDPE/LDPE | 121.095 | 130.199 | 129.545 | | | |
| HDPE/LDPE (60/40)-Pul | HDPE/LDPE | 122.997 | 128.321 | 105.856 | | | |

*averaged over more than one peak

Figure 12A:
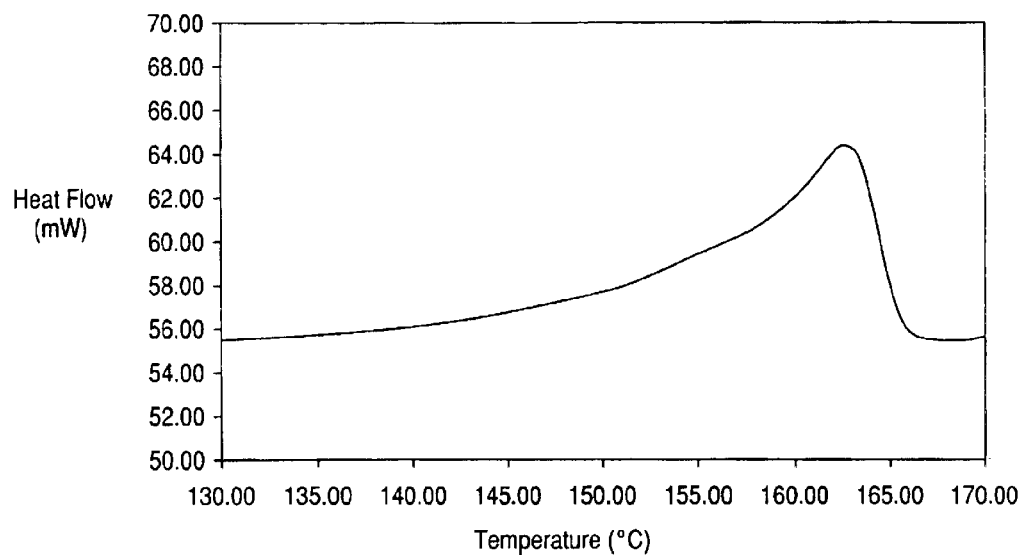
FIGS. 12A,B–18A,B are DSC (differential scanning calorimetry) thermograirs of various as-received post-consumer, flake scrap samples and pulverized powder samples of the invention of various compositions.
Figure 12B:
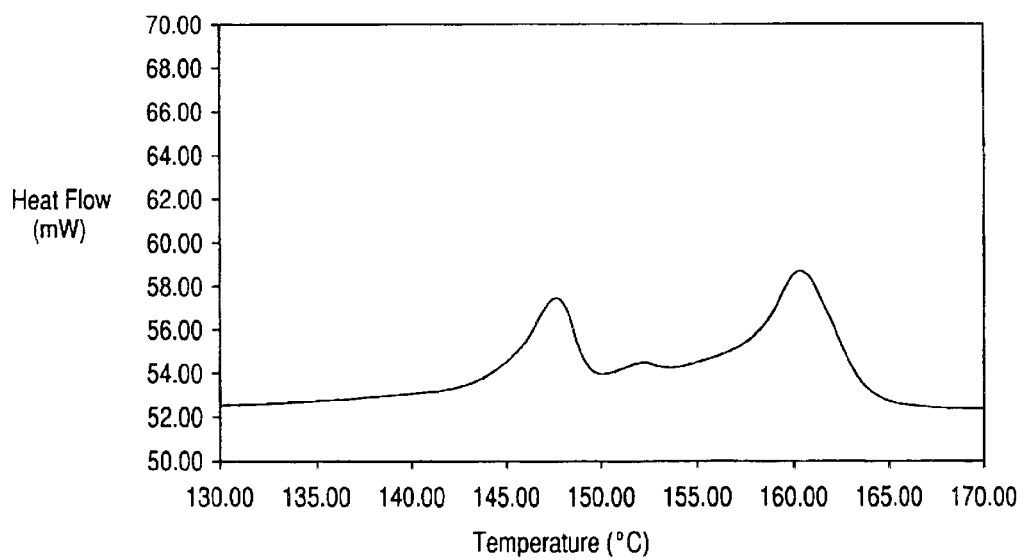
Figure 13A:
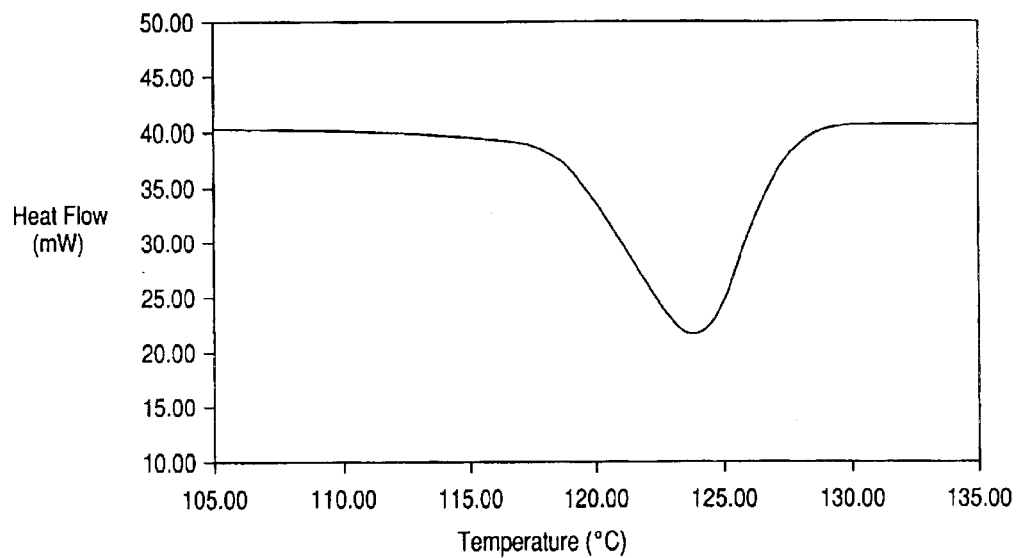
Figure 13B:
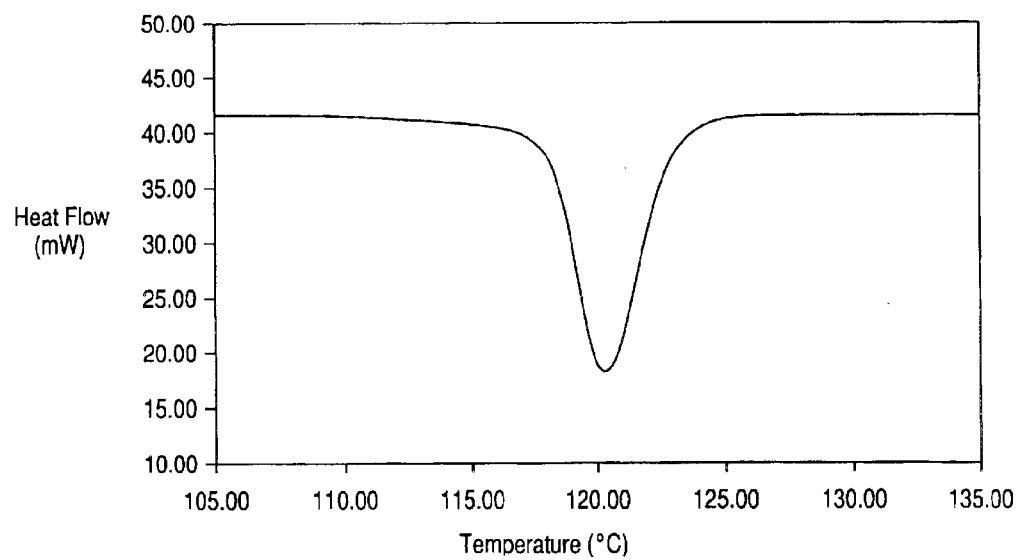

With reference to FIGS. 12A,B–18A,B, DSC thermograms for different as-received flake feedstock and pulverized powder are shown. Before measuring the thermogram, the samples are heated to above their melting temperature and then cooled to ambient temperature at 10 degrees Celsius/minute. A striking difference is seen in FIGS. 12A, B–13A,B for as-received PP flake and pulverized PP powder. In particular, there is a large difference in the melting peaks of as-received PP flakes and pulverized PP powder as shown in FIGS. 12A,B. Despite identical thermal histories, the pulverized sample had two or possibly three distinct melting peaks (FIGS. 12A,B) not observed in the as-received PP flake sample. The crystallization peak is shifted to lower temperature for a pulverized material as shown in FIGS. 13A,B. There is observed a change in the crystalline PP phase after pulverization as shown by a 4 degree Celsius decrease in the onset of Tc and a much sharper peak.

Figure 14A:
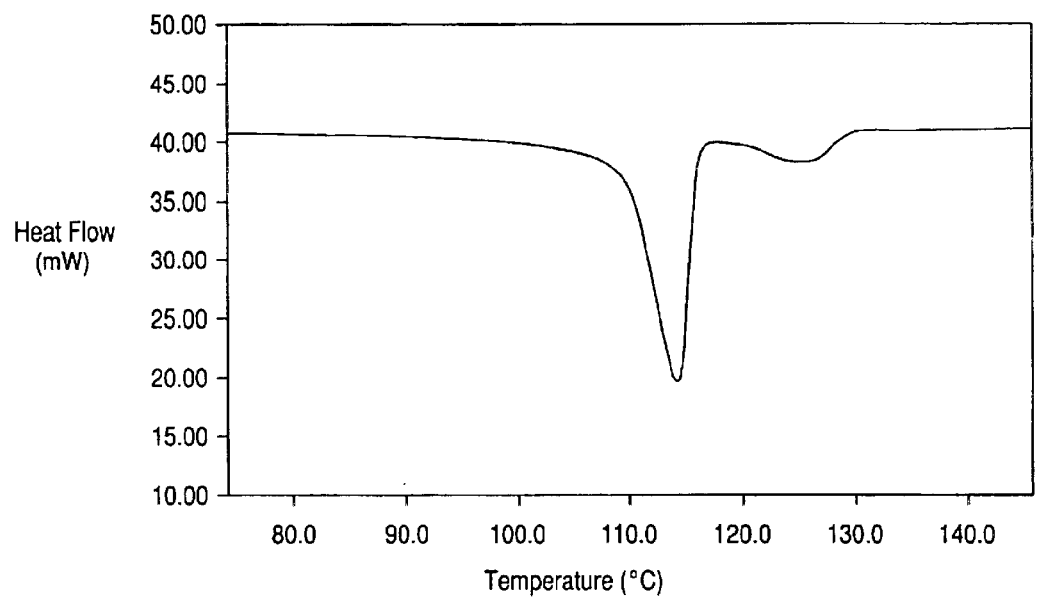
Figure 14B:
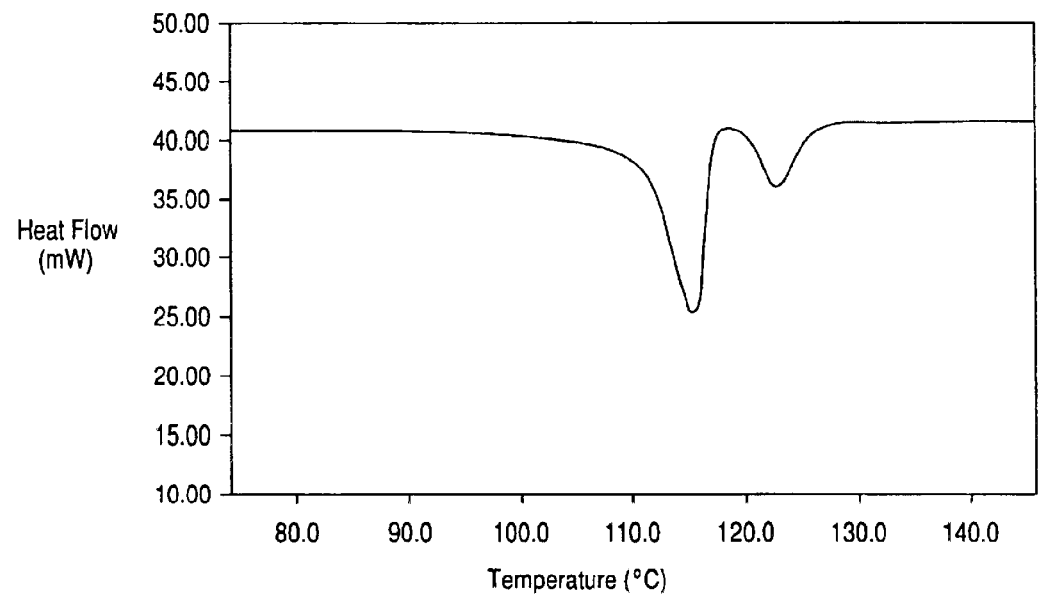

FIGS. 14A,B are thermograms for a 70% HDPE/30% PP blend of as-received flake feedstock and pulverized powder showing crystallization peaks. The change in Hc (ΔHc) of the pulverized sample is 60% larger than that of the as-received sample.

Figure 15A:
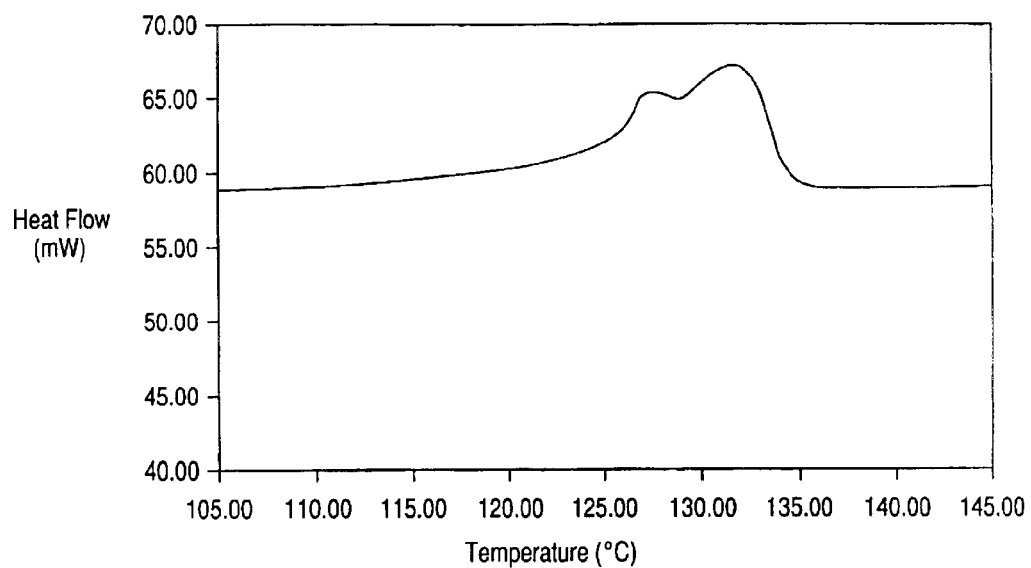
Figure 15B:
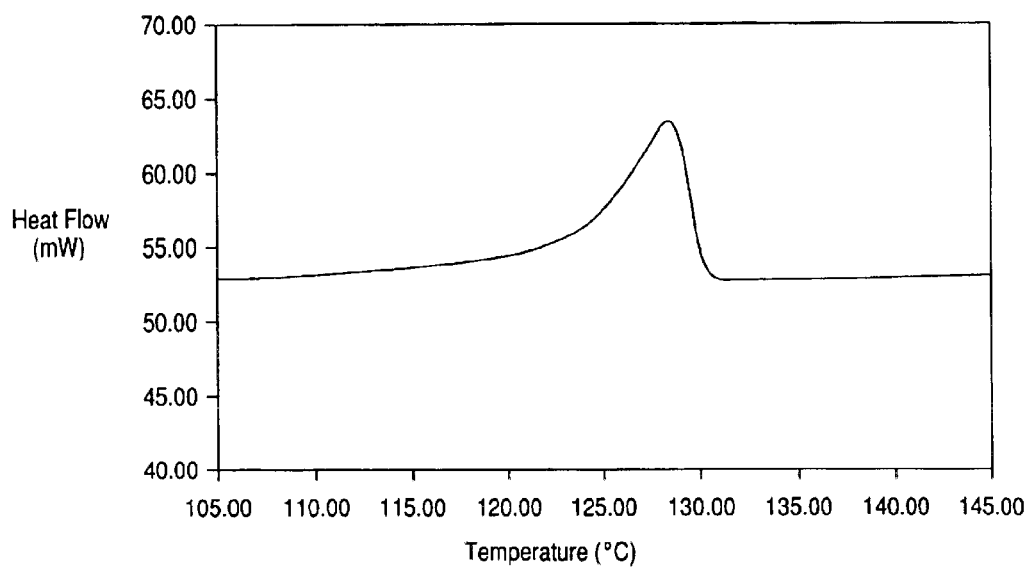
Figure 16A:
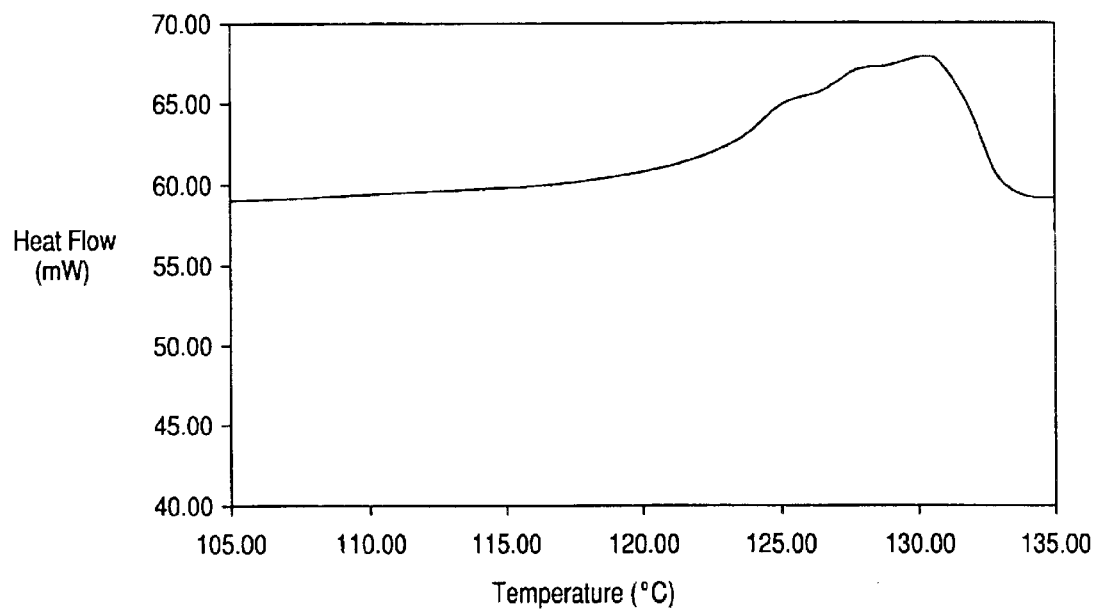
Figure 16B:
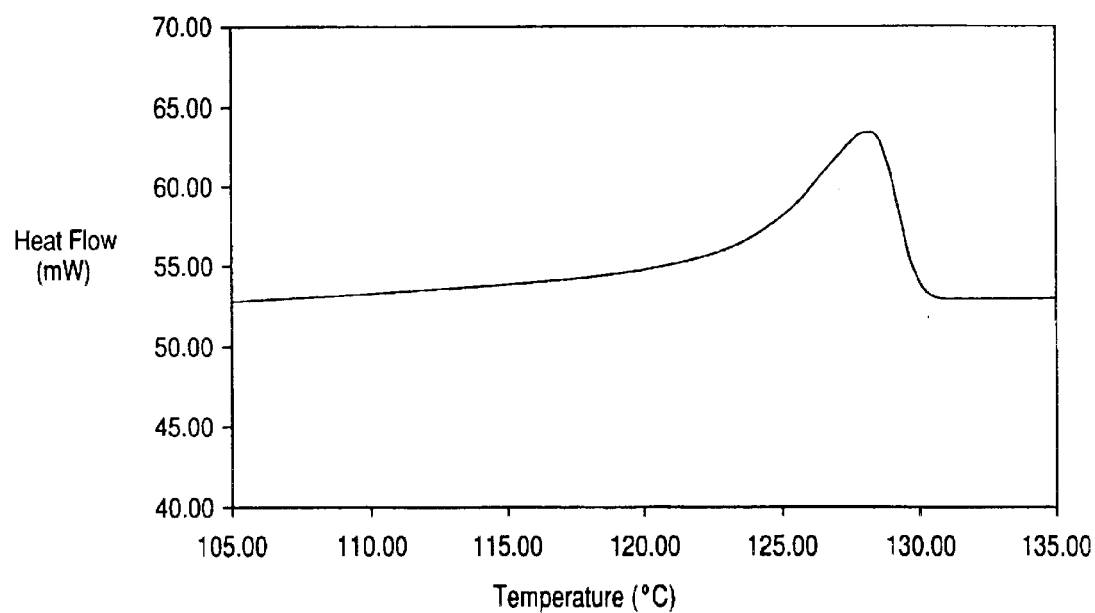
Figure 17A:
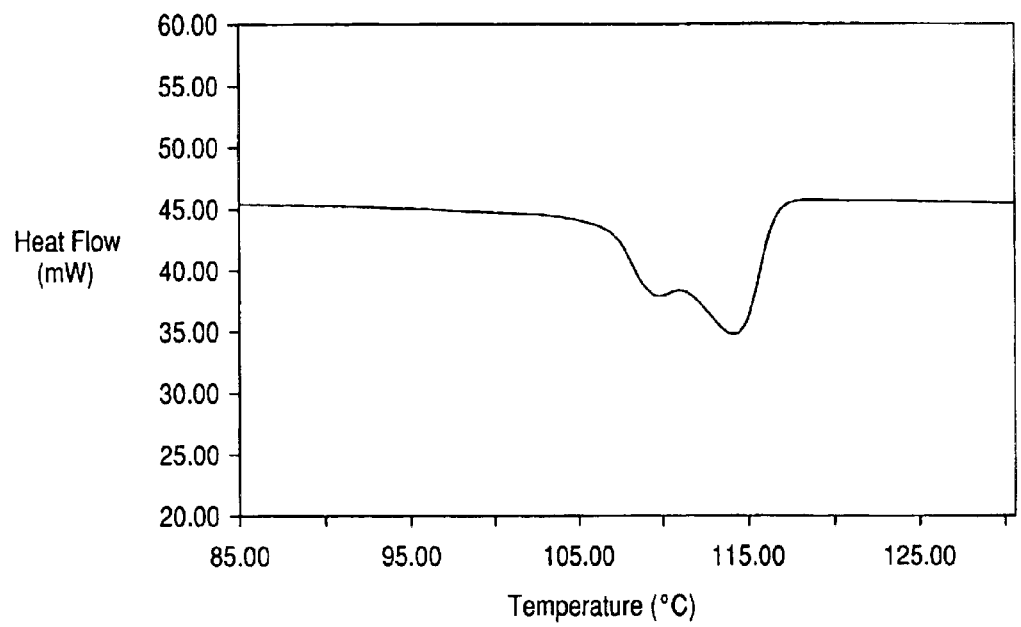
Figure 17B:
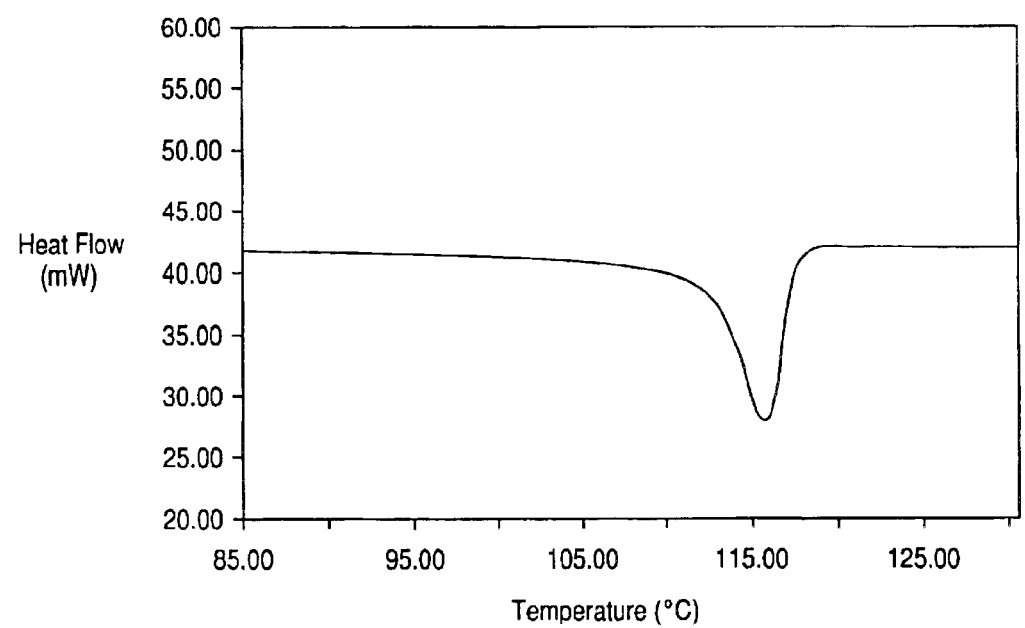

Surprisingly, the largest degree of difference in thermal behavior was observed with as-received 60% HDPE/40% LDPE feedstock flake blends and similar pulverized blends. It is known that these polyolefins are incompatible because of their different densities. With reference to FIGS. 15A,B, a double melting peak observed for the as-received sample is changed into a single, narrower peak for the pulverized sample. After heating to the melt state and cooling to ambient temperature at 10 degrees Celsius./minute, a similar narrowing of the melting peak is evident from the as-received sample to the pulverized sample, FIGS. 16A,B. This shows that permanent change has occurred and that the DSC is not detecting temporary mixing effects caused by the extruder. FIGS. 17A,B show the crystallization isotherm to be unified and sharpened by solid state shear pulverization pursuant to the invention. The same results were also observed for a 40% HDPE/60% LDPE blend. The data provide strong indication that the solid state shear pulverization of the scrap flake material imparts a high degree of in-situ compatibilization to the polymer components involved.

Figure 18A:
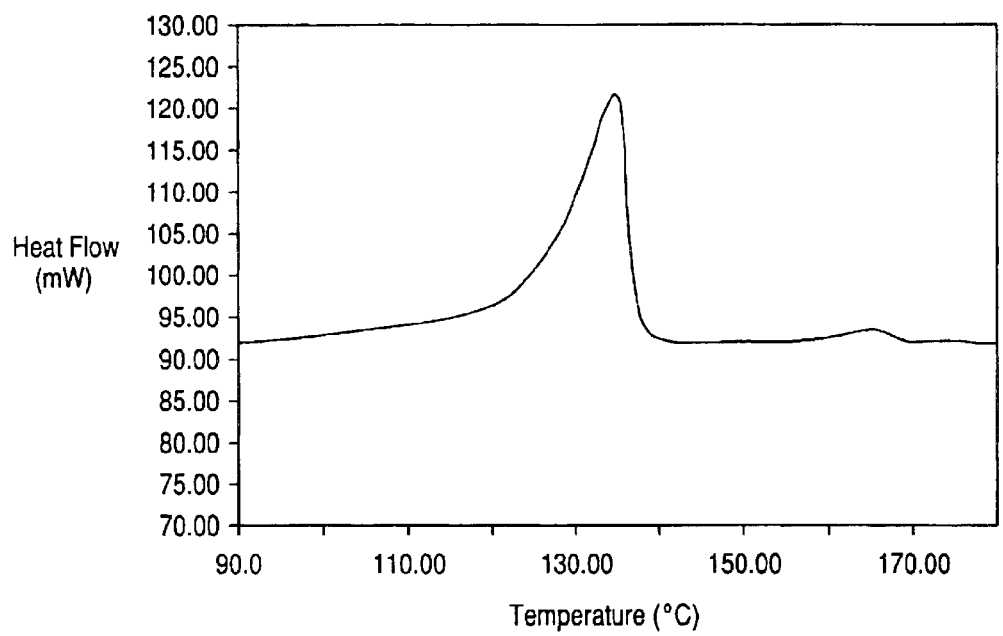
Figure 18B:
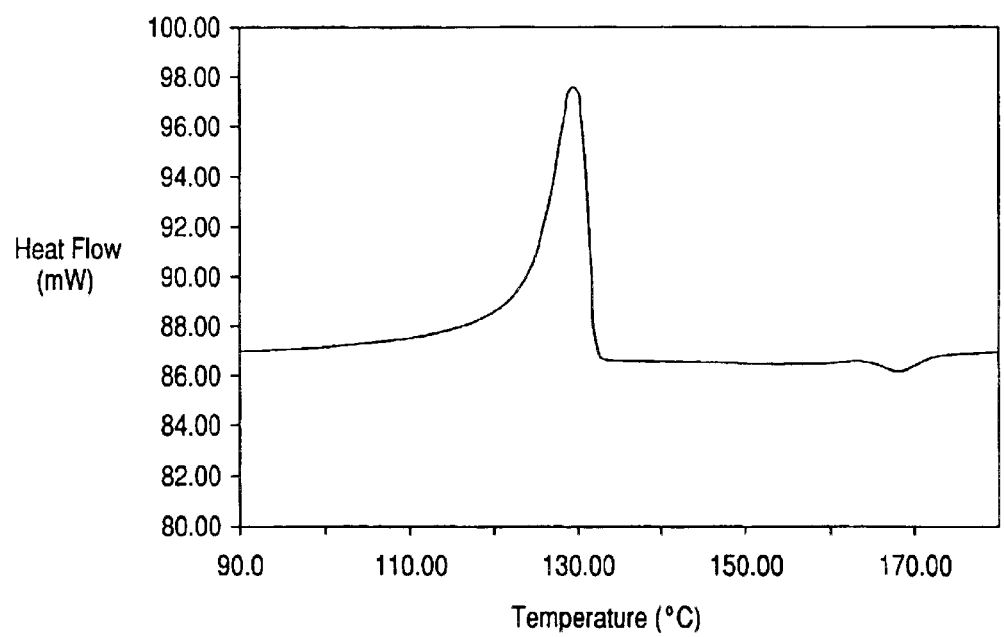

FIGS. 18A,B are a thermogram showing melting traces for a ternary blend of 60% HDPE/30% LDPE/10% PP as-received and pulverized. Similar thermogram results as described above are evident in. FIGS. 18A,B.

The above-described embodiment of the present invention is advantageous in that comminuted (e.g. flake) scrap material can be solid state pulverized to particulates (e.g. powder) that are directly usable as powder feedstock in conventional melt processing techniques, such as rotational molding, blow molding, extrusion, spray coating and others requiring powder feedstock. Moreover, commingled, unsorted plastic scrap can be recycled without the need for costly sortation and in a manner to achieve in-situ compatibilization of different polymers present in the scrap in a once-through pulverization operation to produce recycled, polymeric particulates. Furthermore, the need for compatibilizing and/or reinforcing agent additions in the event two or more thermodynamically incompatible polymers are present in the scrap is avoided, thereby reducing the cost of recycling. This embodiment also is advantageous in that sorted or unsorted, commingled, mixed-color plastic scrap can be recycled to produce recycled, polymeric particulates that are unexpectedly conventionally melt processable to substantially homogeneous light color without color streaking or marblizing. High value, low cost recycled powder products, as well as products molded or otherwise formed of the powder, from sorted or unsorted, commingled multi-colored polymeric scrap material thus can be provided, increasing utilization of available plastic scrap.

Although the embodiments and implementations of the invention described in detail hereinabove relate to the recycling of sorted or unsorted post-consumer and/or post-industrial polymeric scrap material, the invention is not so limited. For example, the invention also can be practiced to solid state pulverize feedstock comprising mixtures of post-consumer and/or post-industrial polymeric scrap and virgin polymeric material feedstock comprising one or more virgin polymeric materials.

In solid state pulverizing mixtures of one or more scrap polymeric materials and one or more virgin polymeric material, the weight %'s of the scrap and virgin materials can be varied over wide ranges to suit particular needs and material availability. For purposes of illustration and not limitation, a mixture of 75 weight % of virgin LDPE (translucent white color pellets) and 25 weight % of the aforementioned chopped scrap LDPE flakes (multi-color) was made and solid state pulverized pursuant to the invention using the aforementioned Berstorff ZE-40A twin screw extruder. The 75/25 virgin/flake LDPE mixture was solid state pulverized without heating (all barrel zones cooled) using processing parameters similar to those set forth in TABLE I for "No heat" solid state pulverization of a solely scrap flake LDPE feedstock.

The solid state pulverized particulates (powder) were injection molded in the manner described hereinabove for the pulverized scrap particulates. The initial 75/25 virgin/flake LDPE feedstock also was injection molded for comparison purposes.

The physical properties of the injection molded specimens are shown in TABLE IV below. It can be seen that the physical properties of the injection molded pulverized powder specimens are generally comparable to those exhibited by the injection molded 75/25 virgin/flake LDPE specimens. The injection molded pulverized powder LDPE specimens exhibited a translucent white color. The injection molded virgin/flake LDPE specimens exhibited a light peach color.

Moreover, a mixture of 60 weight % virgin LDPE (pellets) and 40 weight % chopped scrap LDPE flakes was made and solid state pulverized using the Berstorff ZE40A twin screw extruder with barrel heating (barrel zones 2–4 heated) using processing parameters similar to those set forth in TABLE I for "w/heat" solid state pulverization of a solely scrap flake LDPE feedstock.

The physical properties of injection molded pulverized powder specimens and injection molded 60/40 virgin/flake specimens also are shown in TABLE IV below. It can be seen that the physical properties of injection molded pulverized powder specimens are generally comparable to those exhibited by the injection molded 60/40 virgin/flake specimens.

The injection molded pulverized powder LDPE specimens exhibited a translucent white color. The injection molded virgin/flake LDPE specimens exhibited a medium peach color.

TABLE IV

| MATERIALS | TENSILE PROPERTIES | | | NOTCHED IZOD IMPACT | HDT DEG. C. 66 PSI | HARDNESS SHORE D |
|---|---|---|---|---|---|---|
| | Yield, PSI | Ultimate PSI | % Elong | | | |
| LDPE/v/LDPE-F 75/25 Pulv No heat | 1450 1440 | | 120 130 | NA NA | NA NA | 48 50 |
| LDPE-V/LDPE-F 60/40 Pulv Heat | 1420 1440 | | 135 150 | NA NA | NA NA | 51 51 |

V = Virgin
Pulv = Pulverized
F = Flake
NA—Not applicable (Samples were too flexible for impact and HDT testing)

As mentioned, the present invention also envisions solid state pulverizing of one or more virgin polymeric materials as feedstock. If two or more thermodynamically incompatible virgin polymers are present in the virgin material feedstock, in-situ compatibilization of the virgin polymers should be achievable.

For purposes of illustration and not limitation, virgin LDPE pellets were solid state pulverized using the aforementioned Berstorff ZE-40A twin screw extruder with heating (barrel zones 2–4 heated) and without heating (all barrel zones cooled) pursuant to the invention.

The virgin LDPE pellets were solid state pulverized with heating (barrel zones 2–4 heated) using processing parameters similar to those set forth in TABLE I for "w/heat" solid state pulverization of the solely scrap flake LDPE feedstock. The virgin LDPE pellets were also solid state pulverized without heating (all barrel zones cooled) using processing parameters similar to those set forth in TABLE I for "No heat" solid state pulverization of scrap LDPE feedstock.

The solid state pulverized virgin LDPE particulates (powder) were injection molded in the manner described herein above for the pulverized scrap particulates. The virgin LDPE pellets were similarly injection molded.

The physical properties of the injection molded specimens are shown in TABLE V below. It can be seen that the physical properties of injection molded pulverized specimens are generally comparable to those of injection molded pellet specimens.

Virgin PC pellets also were solid state pulverized with heating (barrel zones 2–4 heated) using the Berstorff ZE-40A twin screw extruder. The virgin PC pellets were solid state pulverized using processing parameters similar to those set forth in TABLE I for "W/heat" solid state pulverization of scrap PP thickness (slightly higher temperature).

The pulverized particulates and virgin pellets were injection molded as described hereinabove. The physical properties of the injection molded specimens are shown in TABLE V. It can be seen that injection molded pulverized powder PC specimens and injection molded pellet specimens exhibited comparable physical properties.

TABLE V

| MATERIALS | TENSILE PROPERTIES | | | NOTCHED IZOD IMPACT | HDT DEG. C. 66 PSI | HARDNESS SHORE D |
|---|---|---|---|---|---|---|
| | Yield, PSI | Ultimate PSI | % Elong | | | |
| LDPE-V (pellets) | 2120 | | 170 | NA | NA | 49 |
| LDPE w/heat pulv | 2030 | | 160 | NA | NA | 52 |
| LDPE pulv No heat | 2040 | | 140 | NA | NA | 50 |
| PC-V (pellets) | 8850 | | 105 | 13.8 | 140 | 83 |
| PC-V pulv w/heat | 8920 | | 100 | 11.2 | 140 | 54 |

LDPE-V = Virgin resin NA 355, Quantum Chemical Co.
PC-V = Virgin resin 301-22, Dow Chemical Co.
NA—Not applicable (Samples were too flexible for impact and HDT testing)

Regardless of the composition of the polymeric feedstock supplied to the extruder, the present invention is advantageous in that energy consumption of the solid state pulverization process is lower than that of conventional batch grinding processes. In addition, the present invention provides a continuous, once-through solid state pulverization process in contrast to conventional batch grinding techniques.

As indicated above, many advantages are realized by the ability to successfully melt-process polymers without having to separate high viscosity polymers from polymers of lower viscosities. There are various situations where such mixing is desirable. In addition to the aforementioned situations, it is sometimes desirable to mix polymeric materials having different viscosities so that a polymer having a high molecular weight and high viscosity which will retain high "melt strength" in film processing, blow molding, and the like, can be provided with a lower viscosity as a result of its mixing with the lower viscosity polymer.

Notably, the present invention achieves its objectives regardless of whether the polymers being mixed (e.g., unsorted recyclables) have very different viscosities (i.e., a high viscosity ratio). Despite such differences in viscosity, the present invention is capable of intimately mixing the two polymers via solid state shear pulverization. The resulting particulates are more intimately mixed and potentially stable than products manufactured from mixtures of the same polymers which are melt-mixed, rather than being solid state pulverized.

The solid state pulverization technique also provides the desired intimate mixing of such polymers sooner than melt mixing. As indicated by Scott & Joung, the melt mixing process for a blend of polymers with such unmatched viscosities typically is delayed by a significant period of time until phase inversion occurs. Solid state pulverization according to the present invention, however, requires no substantial time delay to achieve phase inversion (i.e., intimate mixing) in subsequent melt processing. The present invention therefore provides an industrial expedient, as well as well as economic efficiencies.

This lack of delay in phase inversion is demonstrated by subjecting several mixtures of low viscosity polyethylene and high viscosity polystyrene, with viscosity ratios (at one temperature and shear rate) in excess of 100 (high-to-low viscosity) to solid state pulverization and then melt-processing the resulting particulates. The solid state shear pulverization process is implemented by feeding the polymer materials as pellets into a solid state pulverizer, for example, of the type described above. The mixture undergoes solid state pulverization at high shear and pressure but at relatively low temperature. The temperature is sufficiently low to avoid melting of the polymer in the case of semi-crystalline polymers, or to avoid surpassing the glass transition temperature in the case of fully amorphous polymers.

The output of the pulverizer is a fine powder, produced as a result of the accumulation of strain energy in the solid polymer as it goes through the pulverizer, followed by a fracture into powder when the accumulated strain energy is comparable to or greater than the fracture strength of the polymer. In this process of fracture, an intimate mixing of the polymer chains from different pellets is achieved, even for materials that do not normally mix. Such intimate mixing is not attainable at short mixing times in conventional melt mixer/processing devices.

Conventional mixing techniques typically require the use of melt mixing devices which exhibit problems when mixing mixtures of polymers with high viscosity ratios, whether the materials are the same polymer species or are different polymers. A high viscosity ratio mix usually results in the low viscosity material dominating the initial short-time flow behavior. This, in turn, means that the low viscosity material forms the initial matrix phase even if it represents the low volume fraction. This has been demonstrated with a low viscosity polyethylene forming less than 10% of a polyethylene/polystyrene mix. In such a mix, only at long mixing times will the majority polymer (based on volume) finally form the matrix phase through the process of phase inversion.

The solid state shear pulverization method, by contrast, results in intimate mixing of the high and low viscosity polymers in the pulverizer where residence times can be short. This advantageously eliminates the need to go through any significantly delayed phase inversion process in a melt mixer.

The following additional examples further demonstrate the advantages of the present invention, especially the microstructural stability in response to annealing, the lack of substantial time delay until phase inversion, and increased intimate mixing as exhibited by decreased percent crystallinity in solid state pulverized blends:

EXAMPLE A

A first blend of polystyrene (PS) and polyethylene (PE) was made by melt mixing these two polymers in virgin pellet form. The PS/PE wt % of the virgin blend was 92.2/7.8. The polystyrene was provided by a batch of BASF 1424, having a melt index of 2.5 grams/10 min at 200 degrees Celsius, a viscosity of 716 (at 180 degrees Celsius and 100/s), and a glass transition temperature of 100 degrees Celsius). The polyethylene was provided by a batch of Epolene C-15, having a melt index of 4200 grams/10 min at 190 degrees Celsius, a viscosity of 1.9 (at 180 degrees Celsius and 100/s), and a melt transition temperature of 101 degrees Celsius). The viscosity ratio (major/minor) therefore is 333, well above the threshold of ten described by Scott & Joung.

The first blend was subjected to melt mixing in a Haake Rheomix 40 with Banbury blades at 180 degrees Celsius and also at 160 degrees Celsius. The melt mixing speed was set to 50 r.p.m.

Figure 19:
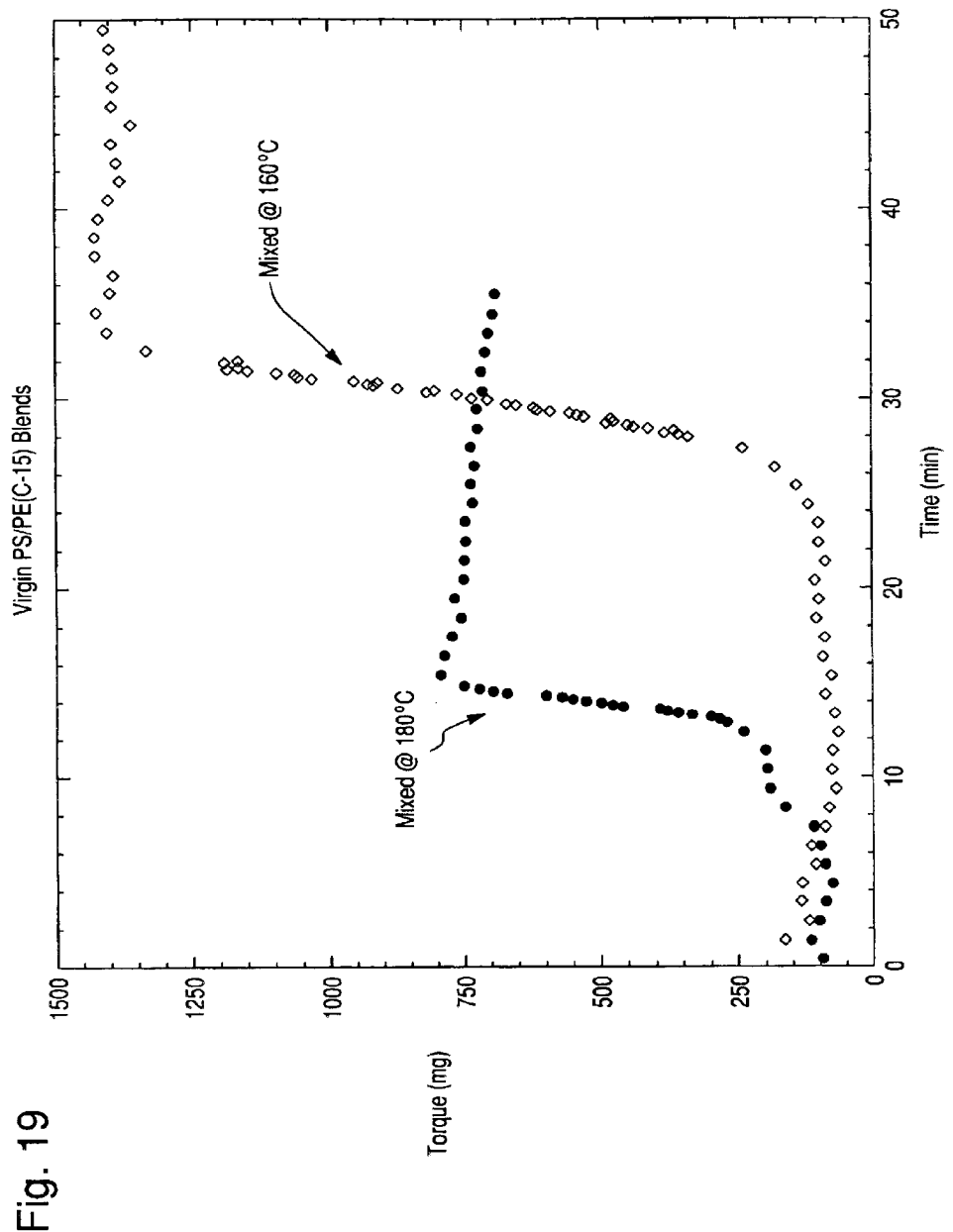
FIG. 19 is a graph of the torque as a function of time for a virgin-based mix of polystyrene (PS) and polyethylene (PE) during a melt mixing process.

FIG. 19 is a graph of the torque as a function of time for the virgin-based mix. At both temperatures, for the first ten minutes, the PE melts and initially assumes the continuous phase. The PE coats the PS pellets and mixer walls allowing for little PS deformation. Only after the initial ten minutes does phase inversion occur, as the PS assumes the continuous phase and the PE the dispersed phase. The phase inversion is demonstrated by a rapid rise in torque.

For purposes of comparison, another batch of the first blend was subjected to solid state pulverization, according to the present invention. The pulverized blend then was subjected to the same melt mixing process as the virgin-based first blend.

Figure 20:
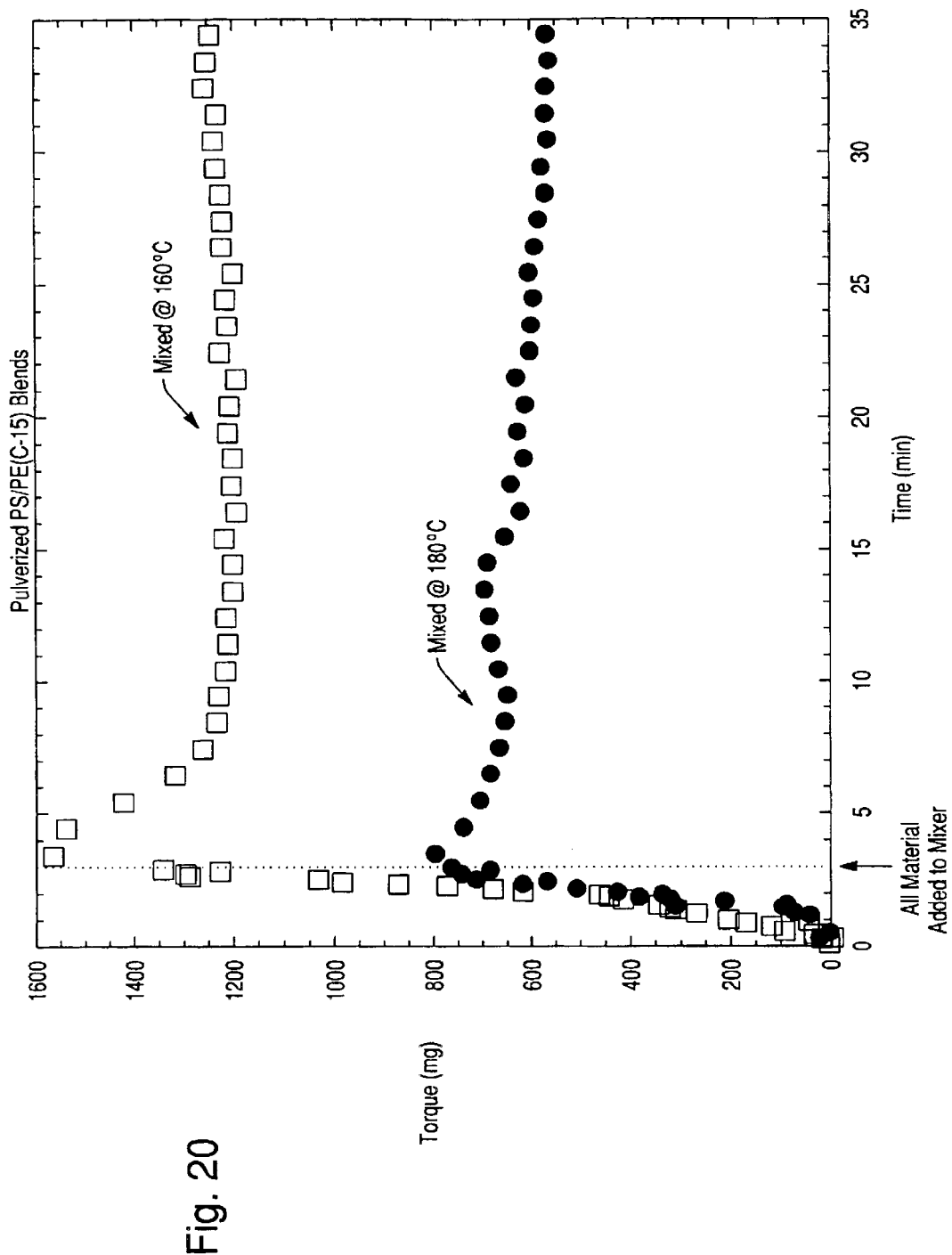
FIG. 20 is a graph of the torque as a function of time for the pulverized version of the polystyrene (PS) and polyethylene (PE) blend.

FIG. 20 is a graph showing the torque as a function of time for the pulverized blend at 160 degrees Celsius and 180 degrees Celsius. The pulverized blend undergoes no significantly delayed phase inversion. The slight delay in the torque increase shown in FIG. 20 for the pulverized blend is not a significant delay in phase inversion, but rather represents the amount of time it took for the particulates to be delivered to the mixing device (about 3 minutes). Notably, this "torque rise-to-time" relationship does not change for the pulverized blend as the temperature is varied, though the magnitude of the torque does vary from one temperature to the other. The contrary is true for the virgin blend, as demonstrated by FIG. 19.

Figure 21:
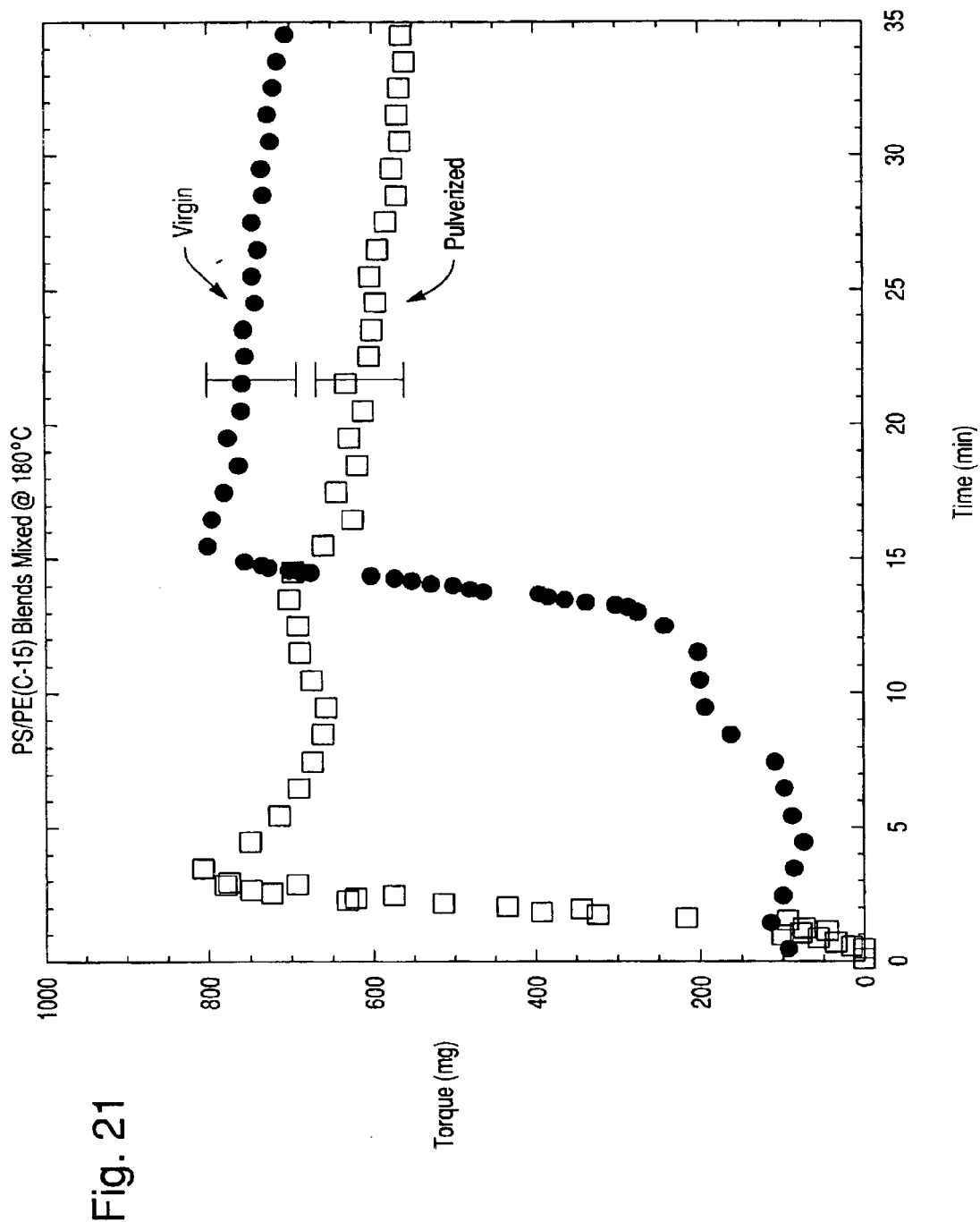
FIG. 21 is a graph showing the torque as a function of time for both the pulverized version and the virgin-based versions of the PS and PE blend when the melt mixing temperature is 180 degrees Celsius.

FIG. 21 is a graph showing the torque as a function of time for both the pulverized version and the virgin-based versions of the first blend when the melt mixing temperature is 180 degrees Celsius.

EXAMPLE B

A second blend of polystyrene (PS) and polyethylene (PE) was made by melt mixing the polymers in virgin pellet form. The PS/PE wt % of this virgin blend also was 92.2/7.8. The polystyrene was provided by a batch of BASF 1424, having a melt index of 2.5 grams/10 min at 200 degrees Celsius, a viscosity of 716 (at 180 degrees Celsius and 100/s), and a glass transition temperature of 100 degrees Celsius). The polyethylene in the second blend, however, was provided using a batch of Epolene C-10, having a melt index of 2250 grams/10 min at 190 degrees Celsius, a viscosity of 3.3 (at 180 degrees Celsius and 100/s), and a melt transition temperature of 104 degrees Celsius). The viscosity ratio (major/minor) of the second blend therefore is 200, also well above the threshold described by Scott & Joung.

The second blend was subjected to melt mixing in a Haake Rheomix 40 with Banbury blades at 180 degrees Celsius. The melt mixing speed was set to 50 r.p.m.

Figure 22:
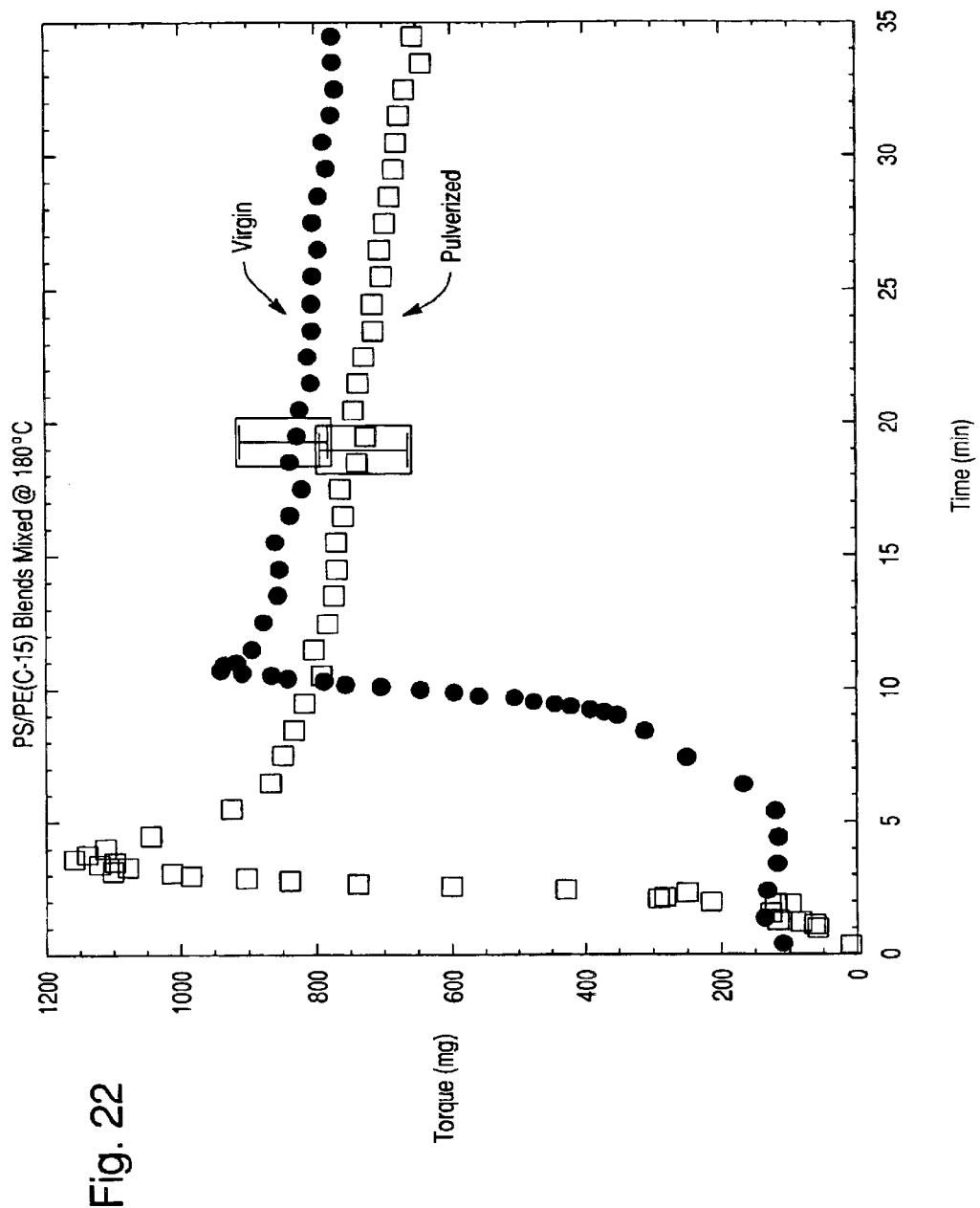
FIG. 22 is a graph of the torque as a function of time for a virgin-based mix of another blend of PS and PE during a melt mixing process.

FIG. 22 is a graph of the torque as a function of time for the virgin-based mix. For the first ten minutes, the PE melts and initially assumes the continuous phase. The PE coats the PS pellets and mixer walls allowing for little PS deformation. Only after the initial 8–10 minutes does phase inversion occur, as the PS assumes the continuous phase and the PE the dispersed phase. The sudden rise in torque demonstrates the phase inversion. Generally, the lower viscosity PEs (e.g., C-15 instead of C-10) require more mixing time.

For purposes of comparison, another batch of the second blend was subjected to solid state pulverization, according to the present invention. The pulverized version of the second blend then was subjected to the same melt-mixing operations as the second blend of virgin pellets. As in the case of Example A, there is no significant delay in phase inversion associated with the pulverized version of the second blend. In FIG. 22, the pulverized version is represented by the square data points.

The slight delay in the torque increase shown in FIG. 22 for the pulverized blend is not a significant delay in phase inversion, but rather represents the amount of time it took for the particulates to be delivered to the mixing device (again about 3 minutes).

Both examples A and B demonstrate that the solid state pulverization is performed so that no significant delay in phase inversion occurs when the particulates are subsequently subjected to melt processing. This provides further evidence that the solid state pulverization of the present invention achieves intimate mixing, even of polymers which are conventionally considered to be incompatible by virtue of their differences in viscosity or otherwise. The present invention therefore facilitates the addition of an immiscible, low viscosity additive to a high viscosity polymer with short processing times, and the blending of different polymers and homopolymers with unmatched viscosities.

EXAMPLE C

A blend of polypropylene (PP) and polystyrene (PS) was made by melt mixing these two polymers in virgin pellet form. The PP/PS wt % of the virgin blend was 25/75.

This PS-rich PP/PS blend was subjected to melt mixing via injection molding. As a result of injection molding, the glass transition temperature of PS-rich phase of the mixture became 95 degrees Celsius, as compared to 100 degrees Celsius for standard PS. Recycled PS has a glass transition temperature of 98 to 100 degrees Celsius.

For purposes of comparison, the same blend of PP and PS was subjected to solid state pulverization in accordance with the present invention. The PS-rich phase in the resulting pulverized blend exhibited a glass transition temperature of 90 degrees Celsius, indicating that the pulverization achieves a more intimate mix than melt mixing.

The pulverized blend then was subjected to the same melt mixing as the virgin blend. The pulverized blend responded to such melt-mixing by maintaining a glass transition temperature of 90 degrees Celsius. After annealing the blend at 190 degrees Celsius for two hours, the PS-rich phase maintained a glass transition temperature of 90 degrees Celsius indicative of a microstructurally stable PS-rich phase.

To confirm the effect of pulverization, the PS was extracted using known xylene extraction techniques. The glass transition temperature of the PS after extraction returned to 100 degrees Celsius, thereby confirming that the 10-degree change in transition temperature from 100 to 90 degrees Celsius is attributable to the intimate mixing provided by the solid state pulverization of the present invention.

Figure 23:
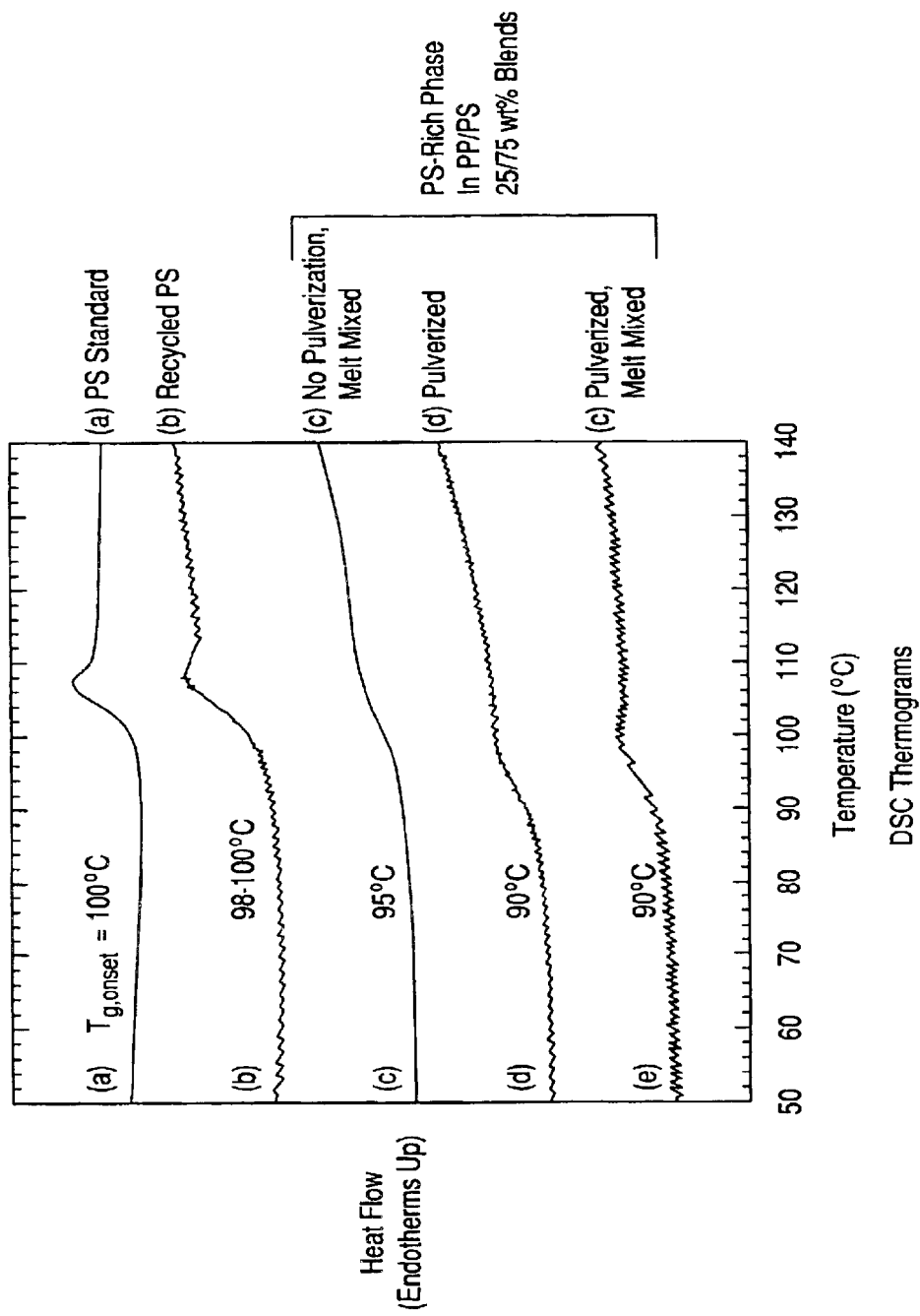
FIG. 23 is a DSC thermogram of the heat flow (in endotherms up) as a function of temperature (in degrees Celsius) for various samples of polystyrene (PS) and mixtures of polypropylene (PP) with the PS, in both solid state pulverized form and virgin form.

FIG. 23 is a DSC Thermogram of the heat flow (with endotherms up) as a function of temperature (in degrees Celsius). In FIG. 23, the temperature transitions for the aforementioned versions of the blend become readily apparent, as does the stability of the pulverized version's microstructure.

The waveform (a) in FIG. 23 was produced by a standard PS sample. The waveform (b) was produced by a recycled PS sample. When the aforementioned unpulverized (i.e., virgin) PS-rich PP/PS blend was subjected to melt mixing, the waveform (c) was produced. The waveform (c) indicates that the glass transition temperature of the PS-rich phase in that particular blend is 95 degrees Celsius when it is melt mixed. By contrast, the waveform (d) was produced by the PS-rich phase in the solid state pulverized version of the PS-rich PP/PS blend. According to waveform (d), the glass transition temperature of the PS-rich phase in the subject blend is 90 degrees Celsius.

Notably, when the solid state pulverized version of the PS-rich PP/PS blend is subjected to melt mixing, the glass transition temperature remains at 90 degrees Celsius, as indicated by the waveform (e) in FIG. 23. After annealing the blend at 190 degrees Celsius for two hours, the resultant waveform matches the waveform (e) in FIG. 23, therefore demonstrating the stability of the pulverized version of the PS-rich PP/PS and providing further evidence that the microstructure of the solid state pulverized version is more stable than that which is produced by mere melt mixing. The present invention thus compatibilizes the polypropylene/polystyrene blend.

Evidence of the increased intimate mixing achieved by the solid state pulverization and further evidence of the microstructural stability is provided by testing the percent crystallinity of the PP-rich phase of the PP/PS blend. Preferably, the testing is performed using DSC techniques.

Prior to solid state pulverization, the percent crystallinity in a virgin PP homopolymer is 53%. After solid state pulverization according to the present invention, the percent crystallinity drops to 48%. When the thermal history is erased (e.g., by controlling the cool down rate after the DSC measurement), the percent crystallinity of the virgin PP homopolymer remains at 53%, whereas the percent crystallinity of the pulverized PP homopolymer increases slightly to 49%.

When the PP/PS 25/75 wt % blend is injection molded, the percent crystallinity of the PP in the PP-rich phase becomes 55%. After erasing the thermal history, this percent crystallinity drops to 54%. When the PP/PS 25/75 wt % blend is instead melt mixed using a laboratory-scale "MINI-MAX" mixer (believed to provide the best conventional melt mixing conditions), the percent crystallinity of the PP in the PP-rich phase becomes 49%. After erasing the thermal history, the percent crystallinity of the PP in the PP-rich phase of the melt mixed version of the blend drops to 39%. Melt mixing on such a small scale therefore provides better mixing when compared to injection molding, as demonstrated by the decrease in percent crystallinity from 54% to 39%.

More impressively, however, when the PP/PS 25/75 wt % blend is pulverized, the percent crystallinity of the PP in the PP-rich phase becomes 43%. The percent crystallinity of the PP then drops to 29% when the thermal history is erased. The PP-rich phase in the solid state pulverized version of the PP/PS blend therefore exhibits a reduction in percent crystallinity indicative of more intimate mixing than that which is provided by laboratory-scale melt mixing techniques (believed to be the best melt mixing conditions).

Moreover, after the pulverized version of the blend is annealed for two hours at 190 degrees Celsius, the percent crystallinity of the PP increases only to 32%. Recrystallization of the PP-rich phase in the pulverized blend therefore remains inhibited, even after annealing. In addition, the glass transition temperature remains at 90 degrees Celsius for the PS-rich phase of the pulverized blend, even after annealing for two hours and at 190 degrees Celsius. If significant phase separation had occurred, one would expect the percent crystallinity of the PP-rich phase to return to the original percent crystallinity and would also expect the glass transition temperature of the PS-rich phase to return to 100 degrees Celsius (i.e., the glass transition temperature of PS). The fact that they do not for the pulverized version of the blend further demonstrates the compatibilization which is provided by the solid state pulverization process of the present invention and the stability of the resulting microstructure.

There are several commercial applications of the compatibilizing process of the present invention. One exemplary application involves the mixing of virgin polymer resins of high viscosity ratio and of the same polymer species in order to optimize properties. By adding low viscosity polymer, for example, to high viscosity polymer, it is possible to lower the viscosity and thereby increase the throughput in various melt processing applications, such as film processing and blow molding, while maintaining a desired and/or appropriate level of "melt strength" or final, in-use mechanical properties.

A second exemplary application involves mixing of virgin polymer resins of high viscosity ratio and different polymer species in order to optimize properties. Because of typically large differences in the melt temperatures and/or glass transition temperature of different species of polymer, there is often a large viscosity ratio associated with components of many of the conceivable polymer blends, thus reducing the likelihood that such materials can be easily melt-processed into products with optimal microstructure. The present invention, however, eliminates the long-time melt mixing needed to process such blends.

A third exemplary application involves recycling of commingled plastic waste. In this case, as in the second exemplary application, there is likely to be a mix of materials of widely different viscosity at normal processing conditions. The present invention nevertheless facilitates intimate mixing in the pulverizer, eliminating the long-time melt-mixing normally needed to process such blends.

A fourth exemplary application involves mixing recycled polymer of one species with virgin polymer of the same or different species. Such a mixture may be used to reduce feedstock cost and/or to produce a "green" product. Solid state shear pulverization can increase the likelihood that such mixtures can be used commercially as it will eliminate the long-time melt mixing that might otherwise be required if the recycled polymer and virgin polymer have vastly different viscosities at melt processing conditions.

Compounding and plasticization represent still other exemplary applications of the present invention. The commercial applications of the present invention become even more apparent when one considers that over 70 billion pounds of polymers are produced in the United States in one year. The potential for recycling is heretofore largely unrealized. Only two conventional recycling schemes have been proven to be commercially successful on a large scale basis, namely, high density polyethylene (HDPE) and poly (ethylene terephthalate) (PET). Heretofore, very little recycling of commingled waste has been performed. In the past, recycling of commingled waste required separation or sorting and/or provided weak adhesion between phases and sub-optimal microphase morphology (leading to poor mechanical properties in resulting products). The commercial advantages of the present invention become even more apparent when one considers the high cost and problems associated with blends of virgin materials.

Notably, the solid state pulverization process described above can be performed continuously, is environmentally benign, and provides chain scission which advantageously results in a powder containing a free radical population. Evidence of chain scission includes changes in the molecular weight distribution and melt flow rate. Characterization of the glass transition temperature ($T_g$) of polystyrene in a PP/PS 25/75 weight % blend reveals a 10 degree Celsius reduction in the glass transition temperature ($T_g$) for the polystyrene-rich phase upon pulverization. Additionally, the PP-rich phase exhibits a reduced ability to crystallize as compared to the PP homopolymer.

Moreover, the pulverization of low viscosity ratio PS/PE (92.2/7.8 weight %) blends advantageously eliminates significant delays in phase inversion and long mixing times. Crystallinity and glass transition studies, coupled with the mixing studies, indicate that intimate mixing occurs upon pulverization and microstructure stabilization (i.e., compatibilization). Similarly, some pulverized blends of PP/PS and PS/PMMA exhibited mechanical property improvements, including a factor of four increase in elongation and up to a 30% increase in tensile strength and a 15% increase in flexural strength.

While the invention has been described in terms of specific embodiments and implementations thereof, it is not intended to be limited thereto but rather only to the extent set forth hereafter in the following claims.

We claim:

1. A process of recycling commingled polymeric feedstock, comprising the steps of:

providing commingled polymeric feedstock comprising first and second polymer materials, the first and second polymer materials being thermodynamically immiscible;

applying mechanical energy to the commingled polymeric feedstock through solid state shear pulverization in the presence of cooling to effect intimate mixing of the first and second polymer materials to form a particular mixture, said cooling being sufficient to maintain said first and second polymer materials in a solid state during the pulverization; and making a product from the particulate mixture, said product being microstructurally stable.

2. The process of claim 1, wherein said step of making a product comprises melt processing the particulate mixture.

3. The process of claim 1, wherein said step of making a product comprises blow molding the particulate mixture.

4. The process of claim 1, wherein said step of making a product comprises injection molding the particulate mixture.

5. The process of claim 1, wherein the first and second polymer materials have first and second viscosities, respectively, that are different from one another.

6. The process of claim 5, wherein the first viscosity is more than ten times the second viscosity.

7. The process of claim 1, wherein said step of applying mechanical energy further comprises reducing a crystallinity percentage of one of the first and second polymer materials when said one of the first and second polymer materials is semi-crystalline.

8. The process of claim 1, wherein the first and second polymer materials are of the same type from one another.

9. The process of claim 1, wherein the first and second polymer materials constitute different polymer materials from one another.

10. The process of claim 1, wherein each of the first and second polymer materials is selected from the group consisting of polystyrene materials, polyethylene-materials, polypropylene materials and combinations thereof.

11. The process of claim 1, wherein each of the first and second polymer materials includes more than two polymer materials.

12. The process of claim 1, wherein:

one of the first and second polymer materials has a first viscosity and a favorably high melt strength when subjected to film processing or blow molding, the other of the first and second polymers has a second viscosity which is lower than said first viscosity, said making a product comprises annealing the particulate mixture; and said step of applying mechanical energy to form a particulate mixture and said step of annealing the particulate mixture achieves a polymer mixture having a lower viscosity than the first viscosity without substantially deteriorating the favorable high melt strength.

13. The process of claim 1, wherein said mechanical energy is applied by a twin-screw extruder having side-by-side, intermeshing, co-rotating screws.

14. A process of recycling commingled polymeric feedstock, comprising the steps of:

providing commingled polymeric feedstock comprising first and second polymer materials, the first and second polymer materials having different viscosities from one another;

applying mechanical energy to the commingled polymeric feedstock through solid state shear pulverization in the presence of cooling to effect intimate mixing of the first and second polymer materials to form a particulate mixture, said cooling being sufficient to maintain the first and second polymer materials in a solid state during the pulverization; and melting and then mixing the particulate mixture whereby no substantial time delay occurs before phase inversion.

15. The process of claim 14, further comprising making a product from the particulate mixture, the product being microstructurally stable.

16. The process of claim 15, wherein said step of making a product comprises melt processing the particulate mixture.

17. The process of claim 15, wherein said step of making a product comprises blow molding the particulate mixture.

18. The process of claim 15, wherein said step of making a product comprises injection molding the particulate mixture.

19. The process of claim 15, wherein:

one of the first and second polymer materials has a first viscosity and a favorably high melt strength when subjected to film processing or blow molding, the other of the first and second polymers has a second viscosity which is lower than said first viscosity, said making a product comprises annealing the particulate mixture; and said step of applying mechanical energy to form a particulate mixture and said step of annealing the particulate mixture achieves a polymer mixture having a lower viscosity than the first viscosity without substantially deteriorating the favorable high melt strength.

20. The process of claim 14, wherein the viscosity of the first polymer material is more than 10 times higher than the viscosity of the second polymer material.

21. The process of claim 14, wherein said step of applying mechanical energy further comprises reducing a crystallinity percentage of one of the first and second polymer materials when said one of the first and second polymer materials is semi-crystalline.

22. The process of claim 14, wherein the first and second polymer materials are of the same type from one another.

23. The process of claim 14, wherein the first and second polymer materials constitute different polymer materials from one another.

24. The process of claim 14, wherein each of the first and second polymer materials is selected from the group consisting of polystyrene materials, polyethylene-materials, polypropylene materials and combinations thereof.

25. The process of claim 14, wherein each of the first and second polymer materials includes more than two polymer materials.

26. The process of claim 14, wherein said mechanical energy is applied by a twin-screw extruder having side-by-side, intermeshing, co-rotating screws.

* * * * *